(12) United States Patent
Waldrop et al.

(10) Patent No.: US 8,751,323 B2
(45) Date of Patent: Jun. 10, 2014

(54) ON LINE WEB PORTAL FOR PRIVATE NETWORK SERVICE PROVIDERS

(75) Inventors: Craig Alan Waldrop, San Diego, CA (US); Sukwan Youn, Fremont, CA (US); Lane Gordon Patterson, San Jose, CA (US); Kirk Felbinger, San Jose, CA (US)

(73) Assignee: Equinix, Inc., Foster City, CA (US)

( * ) Notice: Subject to any disclaimer, the term of this patent is extended or adjusted under 35 U.S.C. 154(b) by 0 days.

(21) Appl. No.: 13/614,841

(22) Filed: Sep. 13, 2012

(65) Prior Publication Data

US 2013/0018753 A1    Jan. 17, 2013

Related U.S. Application Data

(63) Continuation of application No. 12/875,048, filed on Sep. 2, 2010, now Pat. No. 8,583,503.

(60) Provisional application No. 61/285,371, filed on Dec. 10, 2009, provisional application No. 61/239,997, filed on Sep. 4, 2009, provisional application No. 61/323,066, filed on Apr. 12, 2010.

(51) Int. Cl.
    *G06Q 30/00*      (2012.01)

(52) U.S. Cl.
    USPC ........................................................ 705/26.1

(58) Field of Classification Search
    USPC ................ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | |
|---|---|---|---|
| 5,170,391 | A | 12/1992 | Arnold et al. |
| 6,345,239 | B1 | 2/2002 | Bowman-Amuah |
| 6,434,156 | B1 | 8/2002 | Yeh |
| 6,873,620 | B1 | 3/2005 | Coveley et al. |
| 7,096,193 | B1 | 8/2006 | Beaudoin et al. |
| 7,577,154 | B1 | 8/2009 | Yung et al. |
| 8,379,656 | B2 | 2/2013 | Waldrop et al. |
| 8,509,249 | B2 | 8/2013 | Waldrop et al. |
| 2001/0034789 | A1 | 10/2001 | Kumagai et al. |
| 2002/0083179 | A1 | 6/2002 | Shaw et al. |

(Continued)

FOREIGN PATENT DOCUMENTS

| | | |
|---|---|---|
| EP | 2066081 A1 | 6/2009 |
| EP | 2510420 | 10/2012 |

(Continued)

OTHER PUBLICATIONS

Liu, Kevin H., "IP Over WDM", John Wiley & Sons, Ltd. © 2002. ISBN: 0-470-84417-5, pp. 19-56.

(Continued)

*Primary Examiner* — Naeem Haq
(74) *Attorney, Agent, or Firm* — Rutan & Tucker, LLP

(57) ABSTRACT

A web-enabled user interface is provided to enable the carriers of private networks to interact and to offer services to one another. The web-enabled user interface is integrated to a switch fabric configured to provide interconnection services for the carriers. The web-enabled user interface is configured to enable the carriers to assign different roles to different representatives. Each of the representatives is granted certain rights and permissions by an administrator representative based on the representative's role. The web-enabled user interface is configured to present to each representative a unique interface based on their roles thus providing each representative a unique experience.

20 Claims, 17 Drawing Sheets

(56) References Cited

U.S. PATENT DOCUMENTS

| | | |
|---|---|---|
| 2002/0174251 A1 | 11/2002 | Lasserre |
| 2003/0055731 A1 | 3/2003 | Fouraker et al. |
| 2003/0149653 A1 | 8/2003 | Penney et al. |
| 2004/0081116 A1 | 4/2004 | Clay |
| 2004/0111429 A1 | 6/2004 | Bou-Ghannam et al. |
| 2004/0228354 A1 | 11/2004 | Anschutz et al. |
| 2005/0185654 A1 | 8/2005 | Zadikian et al. |
| 2006/0002370 A1 | 1/2006 | Rabie et al. |
| 2006/0028998 A1 | 2/2006 | Lioy et al. |
| 2006/0114915 A1 | 6/2006 | Kalkunte et al. |
| 2006/0245557 A1 | 11/2006 | Paden et al. |
| 2006/0288106 A1 | 12/2006 | Kumar et al. |
| 2007/0071029 A1 | 3/2007 | White et al. |
| 2007/0291716 A1 | 12/2007 | Morales Barroso |
| 2007/0291914 A1 | 12/2007 | Berge et al. |
| 2008/0049621 A1 | 2/2008 | McGuire et al. |
| 2008/0049748 A1 | 2/2008 | Bugenhagen et al. |
| 2008/0062876 A1 | 3/2008 | Giroux et al. |
| 2008/0107117 A1 | 5/2008 | Kulkarni et al. |
| 2008/0144632 A1 | 6/2008 | Rabie et al. |
| 2008/0151907 A1 | 6/2008 | Ge et al. |
| 2008/0244150 A1 | 10/2008 | Sharma |
| 2009/0073988 A1 | 3/2009 | Ghodrat et al. |
| 2009/0141703 A1 | 6/2009 | Ghodrat et al. |
| 2009/0161569 A1 | 6/2009 | Corlett |
| 2010/0002591 A1 | 1/2010 | Mizutani et al. |
| 2010/0008365 A1 | 1/2010 | Porat |
| 2010/0318918 A1 | 12/2010 | Mahmoodshahi |
| 2011/0058547 A1 | 3/2011 | Waldrop et al. |
| 2011/0058565 A1 | 3/2011 | Waldrop et al. |
| 2011/0060657 A1 | 3/2011 | Waldrop et al. |
| 2011/0060846 A1 | 3/2011 | Waldrop et al. |
| 2011/0145399 A1 | 6/2011 | Jeyapaul et al. |
| 2011/0268435 A1 | 11/2011 | Mizutani et al. |
| 2012/0106321 A1 | 5/2012 | Alon et al. |
| 2013/0013442 A1 | 1/2013 | Waldrop et al. |
| 2013/0018753 A1 | 1/2013 | Waldrop et al. |

FOREIGN PATENT DOCUMENTS

| | | |
|---|---|---|
| JP | 2013504269 A | 2/2013 |
| WO | WO 2011/029030 | 3/2011 |
| WO | WO 2011/029042 A1 | 3/2011 |
| WO | WO 2011/029047 A1 | 3/2011 |
| WO | WO 2011/072272 | 6/2011 |

OTHER PUBLICATIONS

Asante, Configuration of VLANS, pp. 1-8, Oct. 2008.

IEEE Std 802.1q-2005, *IEEE Standard for Local and metropolitan Area Networks—Virtual Bridged Local Area Networks: Provider Bridges*, 303 pages, May 2006.

The Metro Ethernet Forum, MEF 4, *Metro Ethernet Network Architecture Framework—Part 1: Generic Framework*, May 2004, 28 pages.

The Metro Ethernet Forum, Metro Ethernet Networks—A Technical Overview, 17 pages, version 2.1, Copyright 2002-2004.

The Metro Ethernet Forum, Technical Specification MEF 11, User Network Interface (UNI) Requirements and Framework, 34 pages, Nov. 2004.

The Metro Ethernet Forum, Technical Specification MEF 26, External Network Network Interface (ENNI)—Phase 1, 57 pages, Jan. 2010.

Ex Parte Wada and Murphy, U.S. Patent and Trademark Office Board of Patent Appeals and Interferences Decision on Appeal for Appeal No. 2007-3733 dated Jan. 14, 2008, 9 pages. Alexandria, Virginia USA.

Ex Parte Joseph Henry Vogel, U.S. Patent and Trademark Office Board of Patent Appeals and Interferences Decision on Appeal for Appeal No. 2010-005339 dated Nov. 23, 2011, 13 pages. Alexandria, Virginia USA.

Ex Parte Alain J. Cohen, et al., U.S. Patent and Trademark Office Board of Patent Appeals and Interferences Decision on Appeal for Appeal No. 2009-011366 dated Dec. 1, 2011, 20 pages. Alexandria, Virginia USA.

Notice of Allowance for U.S. Appl. No. 12/875,048 mailed Jul. 3, 2013, 12 pages. U.S. Patent and Trademark Office, Alexandria, VA US.

Restriction Requirement for U.S. Appl. No. 12/875,048 mailed Aug. 2, 2012, 6 pages. U.S. Patent and Trademark Office, Alexandria, VA USA.

Non-Final Office Action for U.S. Appl. No. 12/875,048 mailed Dec. 17, 2012, 18 pages. U.S. Patent and Trademark Office, Alexandria, VA USA.

Final Office Action for U.S. Appl. No. 12/875,042 mailed Aug. 12, 2013, 25 pages. U.S. Patent and Trademark Office, Alexandria, VA USA.

Notice of Allowance for U.S. Appl. No. 12/875,039 mailed Apr. 16, 2013, 26 pages. U.S. Patent and Trademark Office, Alexandria, VA USA.

In re Suitco Surface, Inc. CAFC decision 2009-1418, pp. 1-10, Apr. 14, 2010.

In re Abbott Diabetes Care Inc., CAFC decision 2011-1516, pp. 1-17, Sep. 28, 2012.

Notice of Allowance for U.S. Appl. No. 13/614,865 mailed Apr. 29, 2013, 11 pages. U.S. Patent and Trademark Office, Alexandria, VA USA.

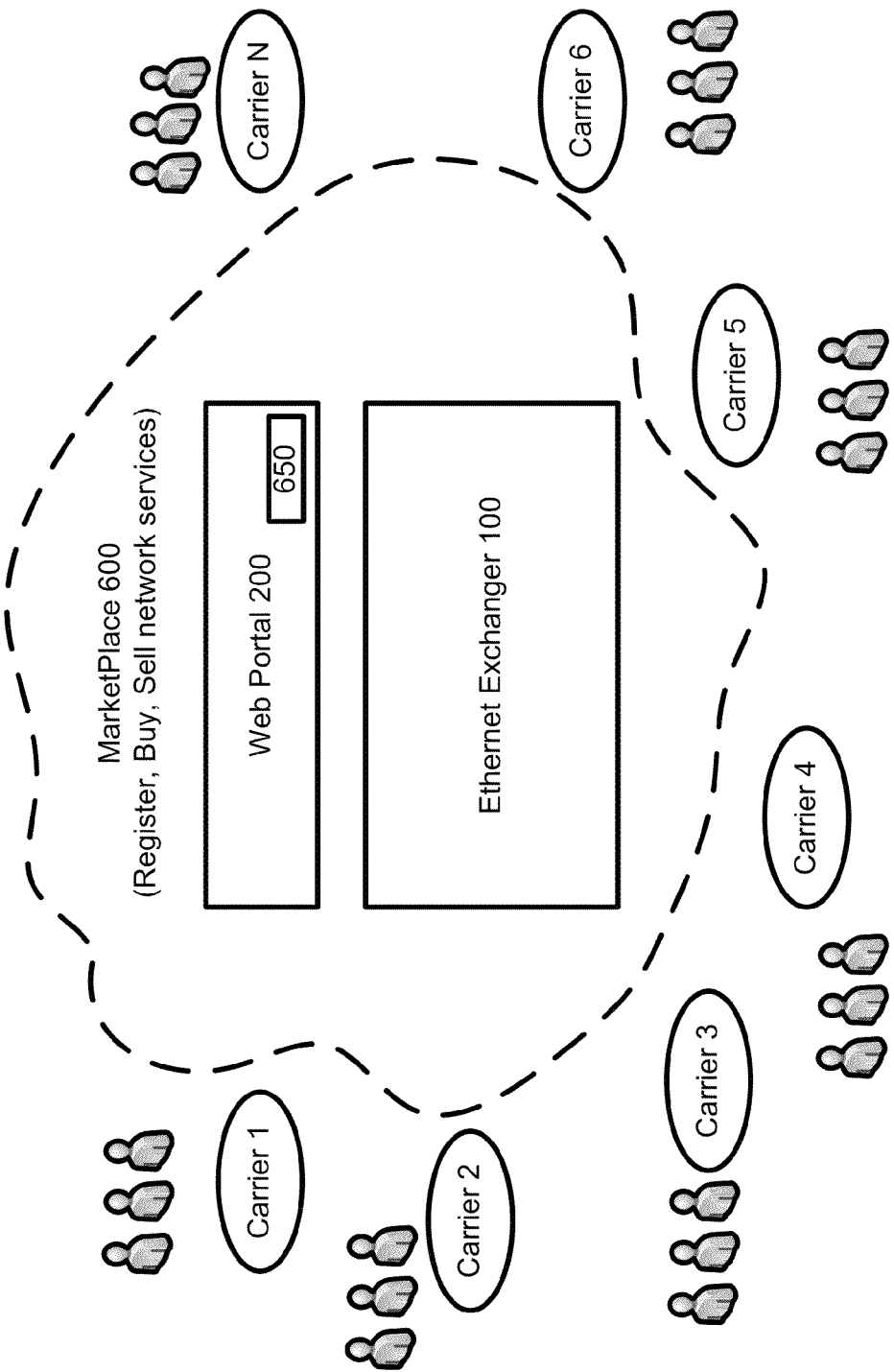

ON LINE WEB PORTAL FOR PRIVATE NETWORK SERVICE PROVIDERS

RELATED APPLICATIONS

This application claims priority to and the benefit as a continuation of U.S. Application titled "AN ON LINE WEB PORTAL FOR PRIVATE NETWORK SERVICE PROVIDERS" filed on Sep. 2, 2010 having application Ser. No. 12/875,048, which claims the benefit of and priority to all four: 1) U.S. Provisional Application titled "ETHERNET EXCHANGE" filed on Dec. 10, 2009 having application Ser. No. 61/285,371 and is incorporated herein by reference in its entirety; 2) U.S. Provisional Application titled "PRIVATE NETWORK CONNECTIVITY PLATFORM" filed on Sep. 4, 2009 having application Ser. No. 61/239,997 and is incorporated herein by reference in its entirety; and 3) U.S. Provisional Application titled "ETHERNET EXCHANGE" filed on Apr. 12, 2010 having application Ser. No. 61/323,066 and is incorporated herein by reference in its entirety, and 4) U.S. Application titled PROCESS AND SYSTEM FOR AN INTEGRATED CARRIER ETHERNET EXCHANGE" filed on Sep. 2, 2010 having application Ser. No. 12/875,048. Each of the above identified applications are incorporated in their entirety by reference herein.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to network connectivity in a many-to-many connection environment. More particularly, an aspect of an embodiment of the invention relates to an online web portal used by private network service providers.

BACKGROUND OF THE INVENTION

One of the challenges that many network carriers face is how to make their services available to their customers at competitive costs. The customers may be located anywhere, and it can be cost prohibitive for each carrier to install their own end-to-end wiring to service these customers. Many carriers already have existing high speed networks (e.g., fiber) in many metropolitan areas. As such, it is possible for one carrier to connect to an existing network of another carrier. This type of connection is referred to as Direct Network to Network Interconnection (D-NNI). Typically, the D-NNI approach is very complex and time consuming. It takes a lot of time for the two carriers to negotiate an agreement and for their engineering teams to come up with a solution. The process is repeated whenever a connection with another carrier is required, making it very inefficient and costly.

SUMMARY OF THE INVENTION

For some embodiments, a web portal is configured to enable participating carriers to assign roles to representatives and to grant rights and permissions to the representatives based on their roles. Navigation of the web portal and subsequent web pages is personalized to the assigned role and/or access privileges assigned to the representative. Options and web pages that a representative having a role not authorized to view are not presented to that representative by the web portal. The web portal is integrated with a switch fabric configured to enable private Ethernet networks of the carriers to be interconnected via virtual circuits established by the switch fabric. The web portal is configured to provide one or more representatives of the carriers to order the virtual circuits to be established and to monitor and troubleshoot issues related to the virtual circuits.

BRIEF DESCRIPTION OF THE DRAWINGS

The drawings refer to embodiments of the invention in which:

FIG. 6 is a block diagram that illustrates an example of a marketplace, in accordance with some embodiments.

Figure 1A:
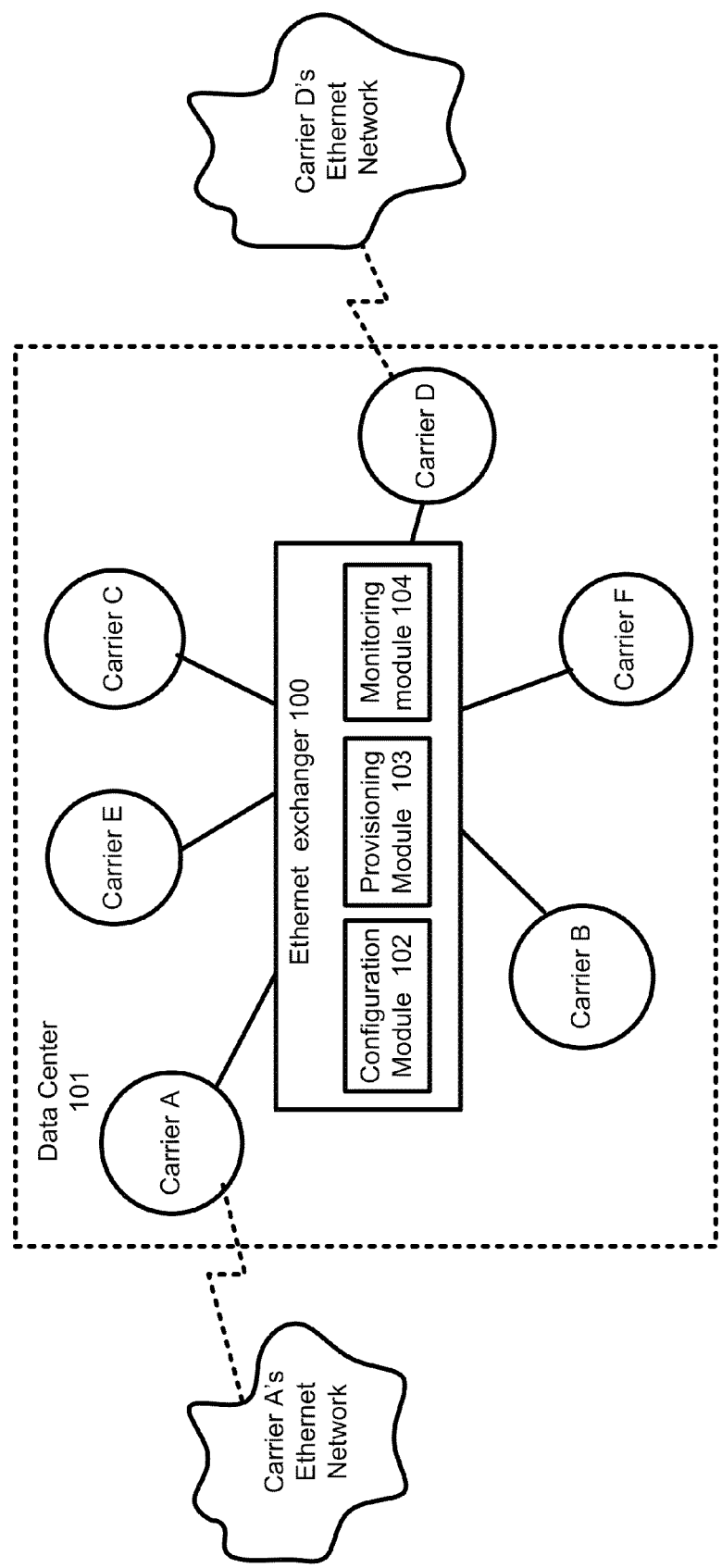
FIG. 1A is a block diagram that illustrates a high-level view of a data center equipped with an Ethernet exchanger, in accordance with some example embodiments.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

According to some embodiments, a web-enabled user experience for commerce and collaboration for networks of two or more carriers connected, via their own ports, to a switch fabric for a private network exchange is disclosed. A web-enabled user interface is provided to enable a plurality of carriers to interact, buy, and sell network services to one another via the World Wide Web. The web-enabled user interface may be configured to enable some carriers to showcase their network services to other carriers. The network services may include lit building information. Request for quote (RFQ) may be generated. Bids may be submitted. Based on the RFQs and bids, two or more carriers may become partners. Based on an indication that a partnership is formed between two partnering carriers, based on a request received from at least one of the two partnering carriers, and based on user profiles of the two partnering carriers, a virtual circuit is established to connect Ethernet networks of the two partnering carriers.

In the following description, numerous specific details are set forth, such as examples of specific data signals, named components, connections, amount of private carriers connected to the switch fabric, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first private carrier, may be made. However, the specific numeric reference should not be interpreted as a literal sequential order but rather interpreted that the first private carrier is different than a second private carrier. Thus, the specific details set forth are merely exemplary. The specific details may be varied from and still be contemplated to be within the spirit and scope of the present invention. The term "coupled" is defined as meaning connected either directly to the component or indirectly to the component through another component.

Overview

A standard web-enabled user interface is provided to enable many different carriers to interact with one another, to view existing network services of their peers, to form partnerships and to expand their services to end users using External network-to-network interconnection (E-NNI). The web-enabled user interface allows the carriers to deliver the services to their end users faster and more cost-effectively. The web-enabled user interface is referred to herein as a web portal because it may be a website that offers many services to the carriers including, for example, buy, sell, order, emails, register, etc. However, the terms may be used interchangeably.

For some embodiments, a private network exchange is a multiple port switch fabric, with one or more Ethernet exchangers for two or more Ethernet carriers, integrated with the web portal. The Ethernet exchanger is a system that is designed to address growing demand for Ethernet services by enabling carriers to interconnect and to expand their services globally. The Ethernet exchanger may be part of an overall physical Ethernet switch fabric which may include one or more Ethernet exchangers to support single connections as well as redundant connections.

The Ethernet exchanger is configured to be used by the carriers as a common point for External network-to-network interconnection (E-NNI). One implementation of the E-NNI may be an Equinix Carrier Ethernet Exchange™ provided by Equinix, Inc. headquartered in Foster City, Calif. The Ethernet exchanger streamlines and simplifies the process of partnering the carriers in a transparent and neutral manner. One example application of an Ethernet exchanger is a co-location and interconnecting data center where many carriers already have their presence. This allows the participating carriers to have a wide range of interconnectivity options in the same facility. The Ethernet exchanger includes ports for two or more carriers to connect their network wirings. This enables a carrier to have options to create many-to-many interconnections with only one-time hook up to the switch fabric, one-time creation of a customer account with the switch fabric, and one-time providing description of its network characteristics using a web portal associated with the switch fabric. The customer account may include the user profile information. The Ethernet exchanger enables the usage of already entered or known information thus simplifying the interconnecting process by avoiding the needs to repeatedly requiring the carriers to enter their information for every connection.

FIG. 1A is a block diagram that illustrates a high-level view of a data center equipped with an Ethernet exchanger, in accordance with some example embodiments. Ethernet exchanger 100 provides a neutral connectivity platform to allow carriers to interconnect their networks (also referred to as carrier Ethernet networks or "CEN"s). The Ethernet exchanger 100 is neutral because it is not biased to any carriers and only provides the interconnectivity service after the carriers become partners. The Ethernet exchanger 100 may be deployed in locations where many carriers already have their equipments such as, for example, data center 101. Each carrier may only need to have one connection to the Ethernet exchanger. In the current example, each of the carriers A-F has one connection to the Ethernet exchanger 100.

By being connected to the Ethernet exchanger 100, a carrier can purchase services and reach out to many end users in many different geographical areas without incurring the same expenses typically associated with having multiple D-NNIs. For example, the carrier A can expand its services using the carrier D's Ethernet network. By connecting to the Ethernet exchanger 100, a carrier may be able to generate additional revenue by offering to sell its network services to the other carriers. For example, the carrier D can offer the opportunity to use the carrier D's network to the other carriers.

A web portal resident on a server and is integrated with a switch fabric of the Ethernet exchanger 100 and is configured to automate an end-to-end process of interconnecting private Ethernet networks of two or more carriers. The interconnection is established via one or more virtual circuits established between two or more ports of the switch fabric. The web portal is configured to present web pages and templates to a browser application on a client machine to solicit information from participating carriers. The information is extracted from the web pages and templates and stored in an associated database in order to enable the participating carriers to 1) publish network services and capabilities offered, 2) search for network services and capabilities offered by each carrier, 3) submit requests for quotes (RFQs) and responses to the RFQs, 4) initiate a provisioning of the virtual circuits between their private Ethernet networks, and 5) monitor and troubleshoot the virtual circuits as well as their own private Ethernet networks from the web-enabled user interface.

Figure 1B:
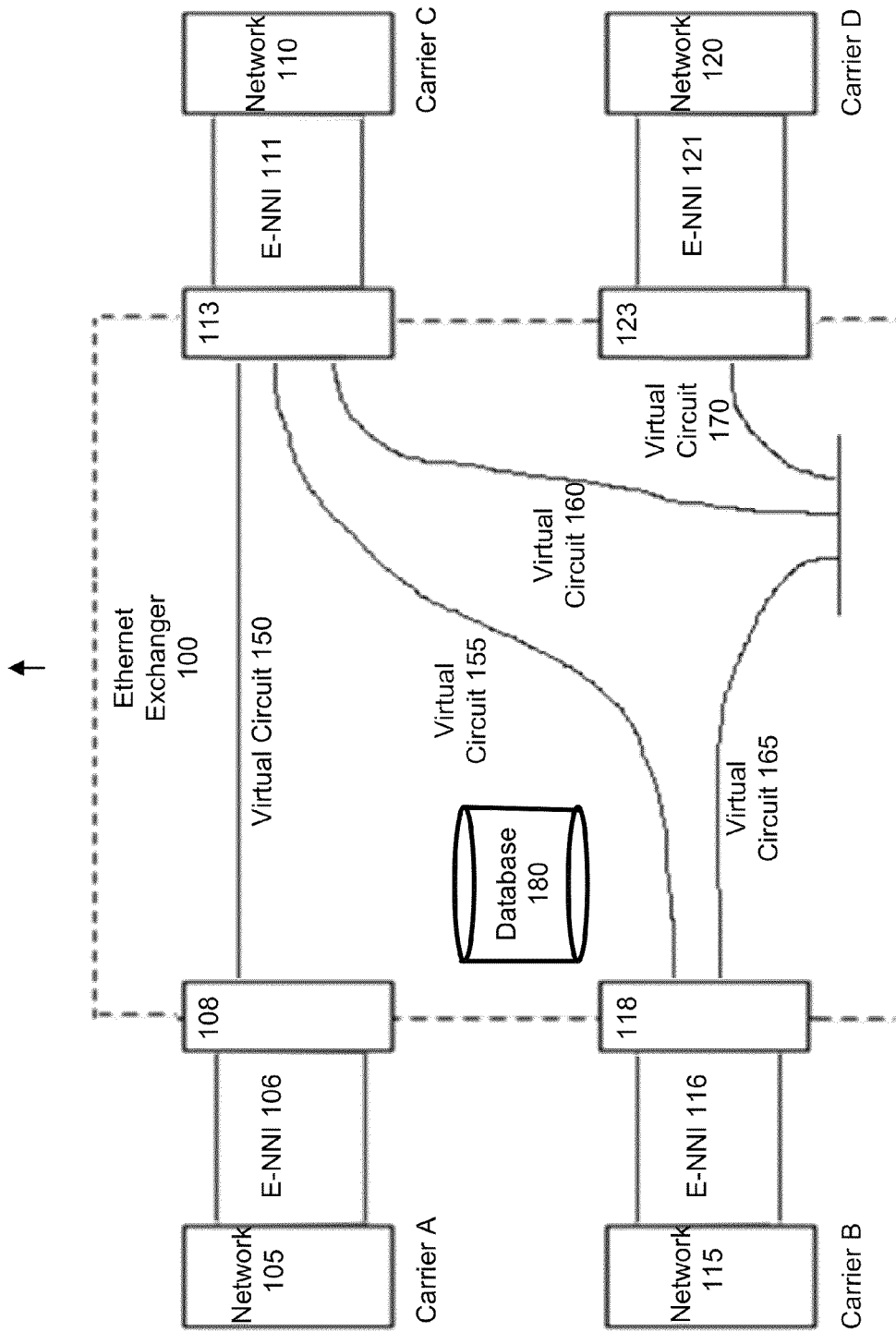
FIG. 1B is a block diagram that illustrates an example of an Ethernet exchanger, in accordance with some embodiments.

FIG. 1B is a block diagram that illustrates an example of an Ethernet exchanger, in accordance with some embodiments. The Ethernet exchanger 100 may include Gigabit Ethernet (Gig-E) ports and 10Gig-E ports such as, for example, ports 108, 113, 118 and 123. In one example, the Ethernet exchanger 100 may be implemented using routers and switches such as a 12-slot Alcatel-Lucent 7450 ESS-12 and one or more Alcatel-Lucent 7750 Service Routers (SR) of Alcatel-Lucent headquartered in Paris, France. Each of the ports (also referred to as a physical connection) of the Ethernet exchanger 100 may support thousands of virtual circuits (also referred to logical connections).

The Ethernet exchanger 100 may be configured to include a configuration module 102, a provisioning module 103, and a monitoring module 104. These modules may be implemented using software scripted routines, hardware logic and any combination of both. The provisioning module 103 may provision virtual circuits. The configuration module 102 may map and translate Ethernet services among the carriers.

The Ethernet exchanger 100 may offer application programming interfaces (APIs) to exchange information with other applications such as, for example, the web portal used by the participating carriers. In the following discussions, the phrases "participating carriers" "qualified carriers" or "carriers" refer to the carriers who have agreements with a provider of the Ethernet exchange services such as, for example, Equinix, Inc.

The Ethernet exchanger 100 may also be configured to include a monitor module 104 which may be implemented using software scripted routines, hardware logic and any combination of both. The monitor module 104 may monitor the status of the virtual circuits and provide status information to the carriers. As mentioned above, the communication with the carriers may be via the web portal. Some examples of network management software used by the monitoring module 102 may include operation support systems (OSS) and simple network management protocol (SNMP). OSS and SNMP are network management protocols used to manage communications networks. The monitor module 104 may be configured to use APIs to exchange information with network management software used by the carriers.

The Ethernet exchanger 100 may support multiple E-NNIs. Each of the E-NNIs is coupled to a port. For example, each of the ports 108, 113, 118 and 123 is coupled to each of the E-NNI 106, E-NNI 111, E-NNI 116, and E-NNI 121, respectively. In the example illustrated in FIG. 1B, the Ethernet services of carrier A and carrier C are mapped and translated across virtual circuit 150. This allows Ethernet traffic to flow between network 105 and network 110. Likewise, the Ethernet services of carrier B and carrier C are mapped and translated across virtual circuit 155. This allows Ethernet frames to be exchanged between network 115 and network 110.

The Ethernet exchanger 100 is configured to support point-to-point connections as well as multipoint connections. In a point-to-point connection, the Ethernet exchanger 100 establishes a virtual circuit that connects networks from two carriers. In a multipoint connection, the Ethernet exchanger 100 establishes virtual circuits that connect networks from many carriers. For example, the virtual circuit 150 is part of a point-to-point connection. The virtual circuits 155, 160, 165 and 170 are parts of multipoint connections. The Ethernet exchanger 100 may map and translate Ethernet services between and among the many Ethernet networks connected by the virtual circuits.

Figure 1C:
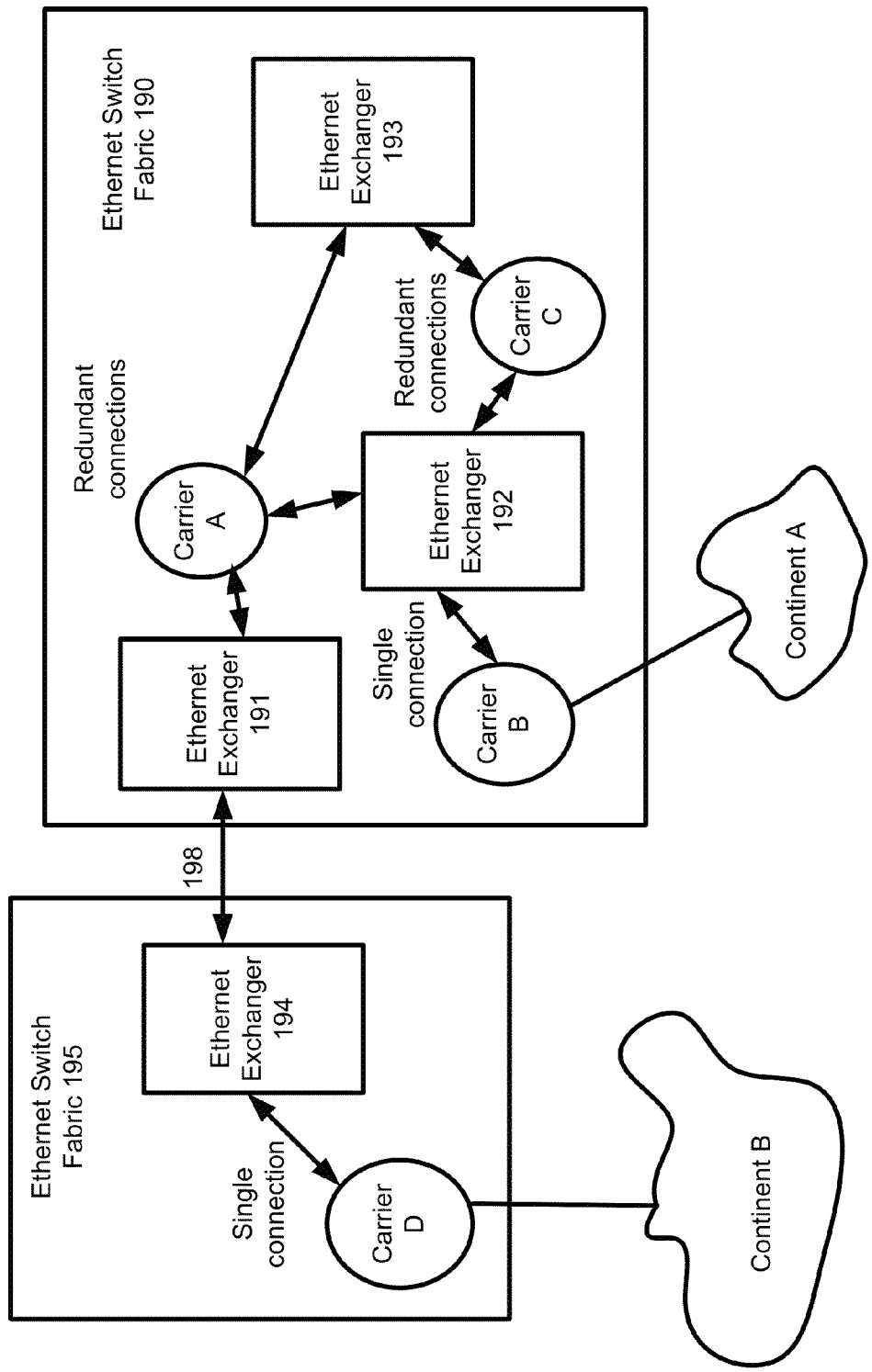
FIG. 1C is a block diagram that illustrates examples of various interconnectivity options available to the carriers, in accordance with some Embodiments.

FIG. 1C is a block diagram that illustrates examples of various interconnectivity options available to the carriers, in accordance with some embodiments. The example illustrates two Ethernet switch fabrics 190 and 195. The Ethernet switch fabric 190 may be located in one metropolitan area while the Ethernet switch fabric 195 may be located in another metropolitan area. Both are communicatively coupled via, for example, high-speed connection 198. The Ethernet switch fabric 190 includes three Ethernet exchangers 191, 192 and 193. An example of redundant connections is illustrated with the carrier A having connections to all three Ethernet exchangers 191, 192 and 193. Similarly, the carrier has redundant connections to the Ethernet exchangers 192 and 193. An example of single connection is illustrated with the carrier B and the carrier D, having a connection to the Ethernet exchanger 192 and 194 respectively.

FIG. 1C also illustrates one advantage of a carrier using an Ethernet exchanger to expand its services in distant geographical areas. The Ethernet switch fabric 190 may be located in a metropolitan area of one continent (e.g., North America). The Ethernet switch fabric 195 may be located in a metropolitan area of another continent (e.g., Europe). By participating in the Ethernet switch fabric platform, the carrier A may be able to offer Ethernet services to clients/end users located in the continent where the carrier D has its presence.

Web Portal

For some example embodiments, the web portal may be configured to present a questionnaire in the form of templates to solicit information from the carriers. The templates are web-based and may be presented as a web page or part of a web page. The templates solicit carrier information and direct that solicited information into fields of the database. The web portal cooperates with the physical switch fabric of the Ethernet exchanger 100 to provide the carriers a standardized interconnecting process. The web portal may be a web site that offers many services to the carriers including, for example, buy, sell, order, emails, register, manage accounts, etc.

Figure 2:
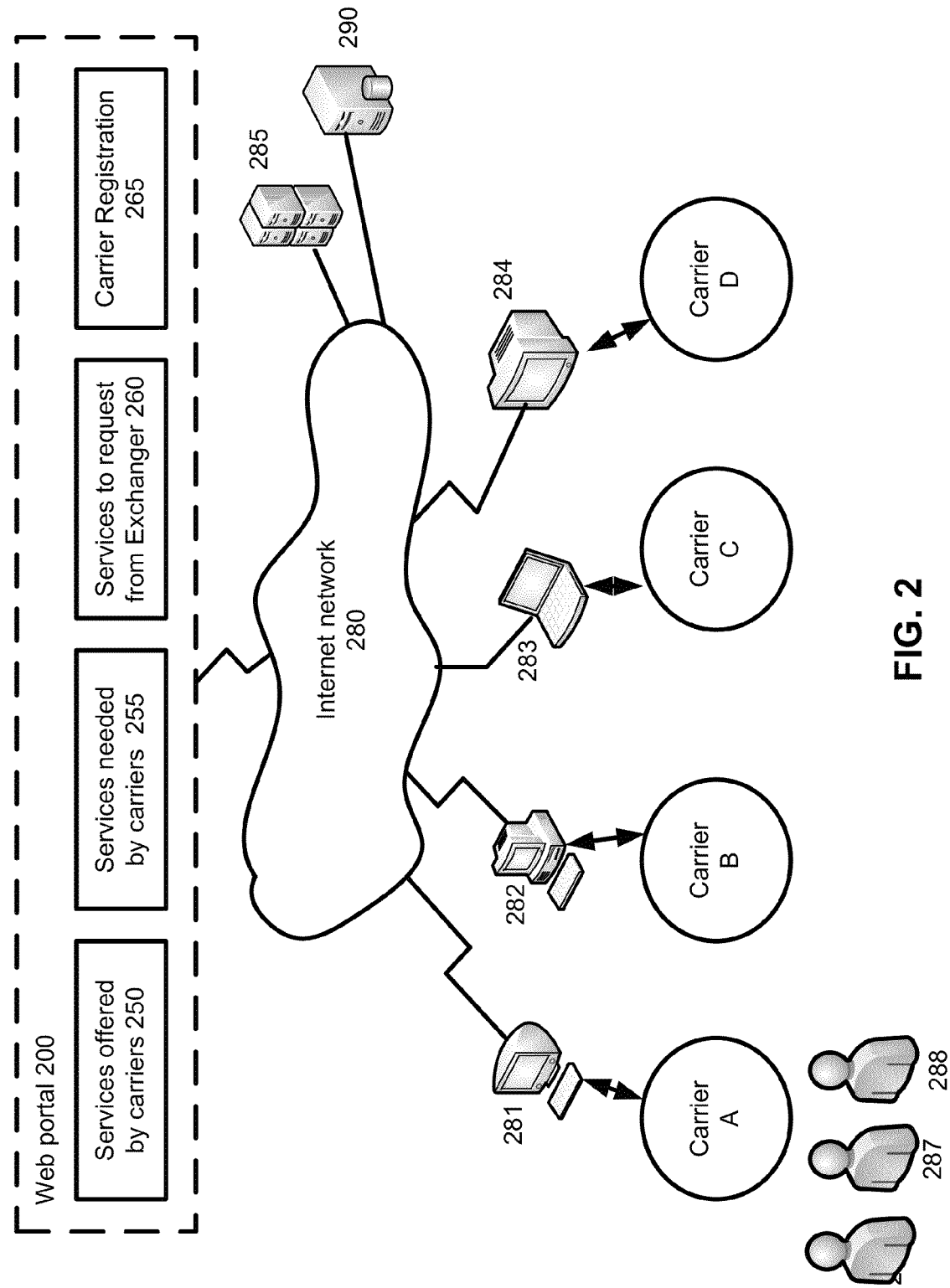
FIG. 2 is a diagram that illustrates one example of the options available to the carriers in a web portal, in accordance with some embodiments.

FIG. 2 is a diagram that illustrates one example of the options available to the carriers in a web portal, in accordance with some embodiments. In this example, web portal 200 may be communicatively coupled to Internet network 280. The web portal 200 may be associated with a computer system that may be coupled to a server system 285 and a database system 290. The server system 285 and the database system 290 are coupled to the Internet 280 and may be combined into one system, or they may be separate systems. The database system 290 and the database system 190 (illustrated in FIG. 1B) may be one or separate systems. The web portal 200 may run as a web-based application on the server system 285. The database system 290 may be configured to store information used by the web portal 200 or information collected by the web portal 200.

The carriers may use computer systems to access the web portal 200 to communicate with one another and to interact with the underlying Ethernet switch fabric such as, for example, switch fabric 190 (illustrated in FIG. 1C). For example, the carriers A-D may use client computer systems 281-284 respectively to connect to the web portal 200 via the Internet 280. The web portal 200 may include a register option to allow a carrier to register and become a participant. For example, a carrier (or carrier representative, user, etc.) may use button 265 to register and to provide information about its networks and services. The carrier may need to provide the information via a series of one or more templates.

Information provided with the templates may be used for service mapping and provisioning as well as any specific extensible markup language (XML) API translations for web services consumption. XML APIs are APIs that are coded using XML. The web portal includes codes that are scripted to automate interaction with the underlying switch fabric, service mapping and/or any logical translation based on XML API and web interface. Each template may be presented by the web portal 200 as a web page or a pop-up window. The information solicited from the carriers may include information about their networks such as, for example:

Footprint and Lit building list
Service metro area
Building connection bandwidth
Ethernet service type and topology
Supporting Maximum Transmission Unit (MTU) size
Supporting VLAN frame type with tag protocol identifier (TPID)
Network protocol information
Ethernet operation and management (OAM) capability
Contact and Escalation information For some embodiments, the lit building information may be entered directly using the web portal 200. Alternatively, the lit building information may be submitted and processed as a batch operation. This batch processing may make it easier for those carriers that have many lit buildings or those carriers that have lit building information stored in formats that are not easily extracted. For some embodiments, the batch processing is performed using an API associated with the web portal 200.

Many of the fields in the template may correspond to fields of a searchable relational database such as, for example, database 290. The templates may be standardized so that they can be used for all carriers. This is advantageous because there is no need to have different set of questions for different carriers as is typically used in the D-NNIs. In addition, a carrier may only need to provide the information about its network once regardless of how many other networks that the carrier may be interconnected with. Information associated with a carrier may be grouped together as a carrier profile. Each carrier profile may be unique. In addition to storing the carrier profiles, the database 290 may also be configured to store other information that may be used by the web portal 200.

The Ethernet exchanger 100 is configured as a transparent aggregation translator between the private Ethernet networks of the carriers. The templates may include a carrier qualification template to allow a carrier to qualify, carrier profile template to allow the carrier to list user account information, service template to allow the carrier to describe services offered as well as network capabilities and characteristics, etc. Two or more of these templates may be combined depending on the implementation.

The web portal 200 may be configured to present the templates to a user or representative of the carrier on a client machine to allow the user to create a user profile for its carrier and associated Ethernet network. The user profile may include services offered by the carrier. The configuration module of the Ethernet exchanger 100 may be configured to extract and store this information in the database. The information from all of the users is aggregated to provide complete and relevant information in response to a search query generated by other users using the online web portal 200. The database may be associated with intelligent routines to discover the queried information and present the aggregated information to the user that is relevant to the query of the user. The information may include a list of a carrier's Ethernet buildings by capacity, price, service level, etc. The information may also include lit building list. The templates enable the collection, the extraction, and the storing of the information into the relational database. The database is configured to store, aggregate and makes the aggregated information searchable and publishable.

The web portal 200 provides a medium that allows a carrier to interact, showcase, and sell its services to other carriers. It allows a carrier to specify information or services that it wants to offer to other carriers and to learn about other carriers' services. This enables the carriers to qualify each other as partners and to form relationships with one another. For example, a carrier may use the button 250 to describe services that it is willing to offer to potential partners. Similarly, a carrier may use button 255 to specify services that it is searching for.

For some embodiments, the information about the services being searched for may be presented in the form of a request for quotes (RFQ). For example, the carrier A may use the web portal 200 to search, view and identify services offered by the carrier D. A representative of the carrier A may use the button 255 to generate an RFQ and cause the RFQ to be sent to the carrier D. When a representative of the carrier D is signed on to the web portal, an RFQ notification is displayed. For some embodiments, the account information or the profile information stored in the relational database may be used to populate fields of the RFQ.

Negotiations between the carrier A and the carrier D may then take place. For some embodiments, the carriers may negotiate among themselves, and then use the web portal 200 to enter the details of their agreements. When there is an agreement between the carrier A and the carrier D, the carrier A may use the button 260 to request the underlying switch fabric and Ethernet exchanger to provision the services. For some embodiments, each carrier may use the web portal 200 to configure and assign representatives to different roles (see FIG. 9 for examples of roles). One representative may be assigned an administrator role and serve as an administrator. The administrator may then assign other representatives from the carrier to other roles such as, for example, sales, engineering, product support, technical support, etc. (illustrated as representatives 286, 287 and 288). Each role may be associated with a different level of access and/or a different level of capabilities. For example, only a sale representative may review the agreements of that carrier, and only a technical support representative may be able to access the network management information.

Provisioning, Mapping and Translation

The Ethernet exchanger 100 is configured to perform interconnection service that aggregates and translates private Ethernet services from the many participating carriers. It provides a many-to-many Layer 2 Network-to-Network Interface (NNI) and standardizes the network-to-network connection process. The Ethernet exchanger is configured to distribute and support multi-regional Ethernet connections among many private networks from a central Ethernet switching fabric. Carrier information from all of the Ethernet networks connected to the Ethernet exchanger is aggregated and stored in the database.

For some embodiments, the configuration module 102 (as illustrated in FIG. 1A) is configured to act as an agent to convert protocols, bandwidth requirements, etc. between the various participating carriers. The Ethernet exchanger 100 is also configured to use APIs to work with a multitude of proprietary systems APIs. The configuration module 102 may include logic and/or software routines to do the handshaking, mapping, and conversion between the different Ethernet protocols independent of the type of Ethernet protocol or network configuration parameters used in either Ethernet network.

Following are some examples of the operations that may be performed by the configuration module 102:

Service VLAN ID translation within multiple network environments

Service VLAN frame translation within multiple network environments

Service MTU adaptation within multiple network environments

Service VLAN TPID translation within multiple network environments

Bandwidth protection within E-NNI Fabric

QoS traverse within E-NNI Fabric

Figure 3A:
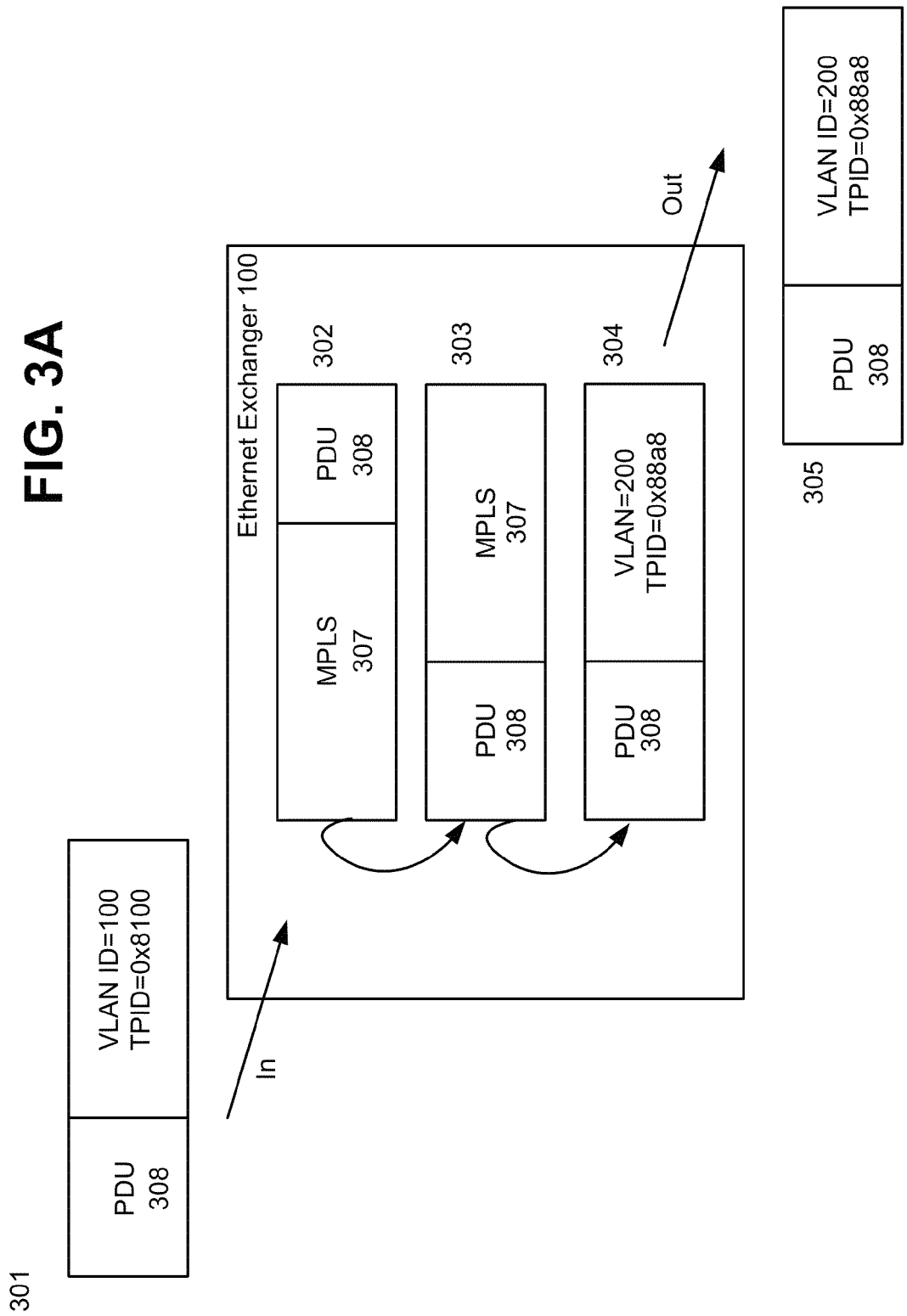
FIG. 3A is a block diagram that illustrates an example of Ethernet frame translation, in accordance with some embodiments.

FIG. 3A is a block diagram that illustrates an example of Ethernet frame translation, in accordance with some embodiments. The Ethernet exchanger 100 is configured to translate frames received from one network into frames that are to be transmitted to another network independent of the proprietary protocol used in either network. In FIG. 3A, frame 310 is transmitted from a first network and includes a protocol data unit (PDU) 308 and a VLAN tag. The VLAN tag includes a TPID value of 0x8100 and a VLAN ID of 100. The TPID value of 0x8100 is configured by the carrier associated with the first network. Each of the ports of the Ethernet exchanger 100 is associated with a TPID value that matches with the TPID of the carrier that is associated with that port.

For some embodiments, the Ethernet exchanger 100 keeps the value of the PDU 308 intact throughout the translation process. When the frame 301 is received, the TPID portion of the frame 301 is stripped and a Multiprotocol Label Switching (MPLS) label 307 is added. This is illustrated as frame 302. The positions of the MPLS data 307 and the PDU 308 in the frame 302 are then switched, as illustrated in frame 303. The Ethernet exchanger 100 then forward the frame 303 by making switching decisions based on the MPLS label 307. The frame 303 is then transmitted across a virtual circuit to a destination port where the Ethernet exchanger 100 replaces the MPLS label 307 with the TPID associated with the destination port. As illustrated with frame 304, the TPID value has been translated to 0x88a8 and the VLAN ID has been translated to 200. The TPID value of 0x88a8 is configured by a carrier associated with a second network. The translated frame is then transmitted from the Ethernet exchanger 100 to the second network as frame 305.

Figure 3B:
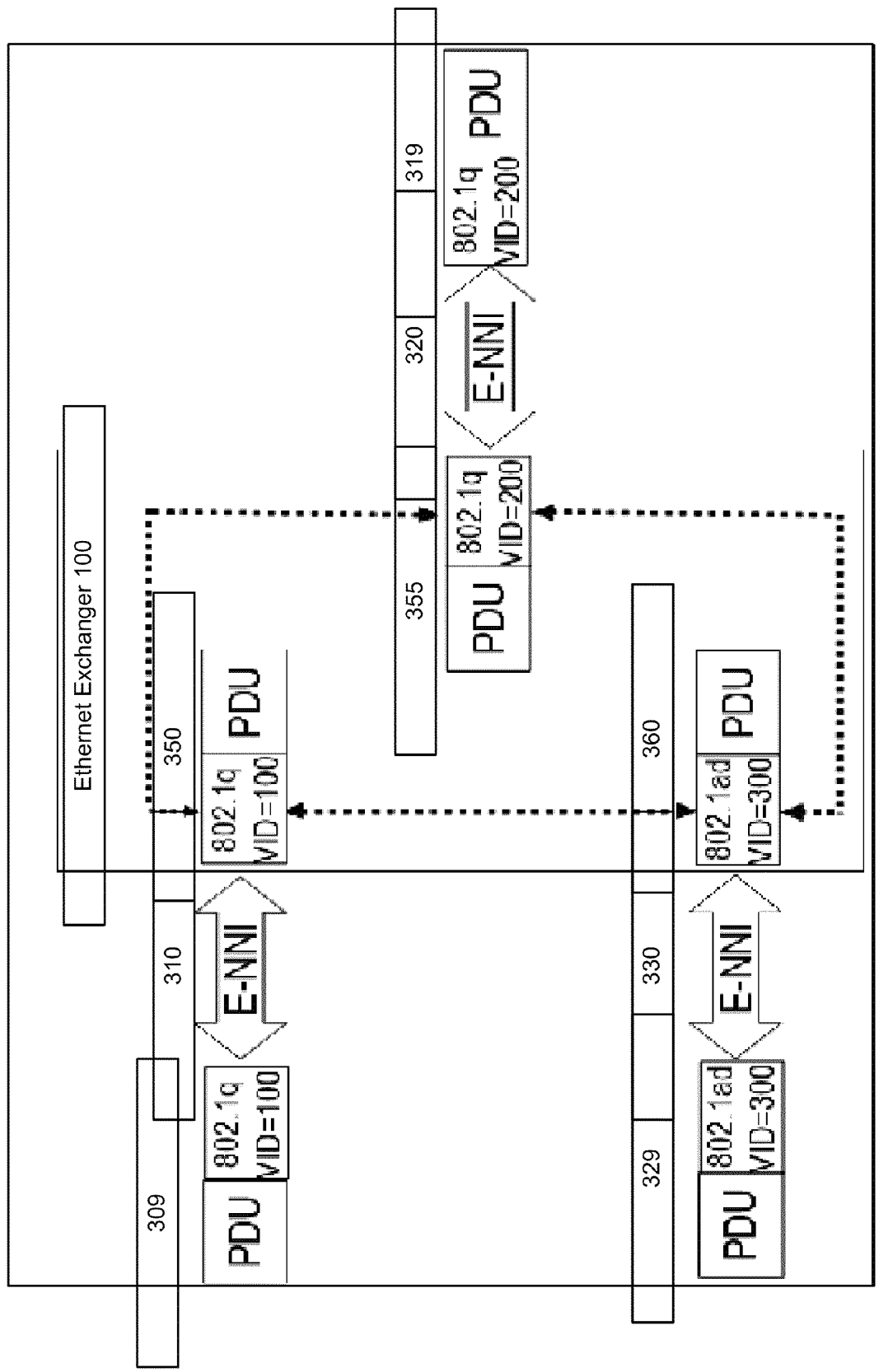
FIG. 3B is a block diagram that illustrates another example of Ethernet frame translation with multiple connections, in accordance with some embodiments.

FIG. 3B is a block diagram that illustrates another example of Ethernet frame translation with multiple connections, in accordance with some embodiments. In this example, the Ethernet exchanger 100 translates frames from three different carriers via E-NNI 310, 320 and 330. Frames 309 and 319 are associated with a similar Ethernet type 802.1q, whereas frame 329 is associated with Ethernet type 802.ad. Similar to the example illustrated in FIG. 3A, as these frames (shown as frames 350, 355 and 360) are received at their respective receiving ports, the frame type and frame ID portion is removed and replaced by MPLS label (or MPLS frame). Their PDU portions remain the same. They are then sent across the appropriate virtual circuits. The translation is completed when the MPLS labels are replaced by the frame information associated with the port at the receiving end.

Figure 3C:
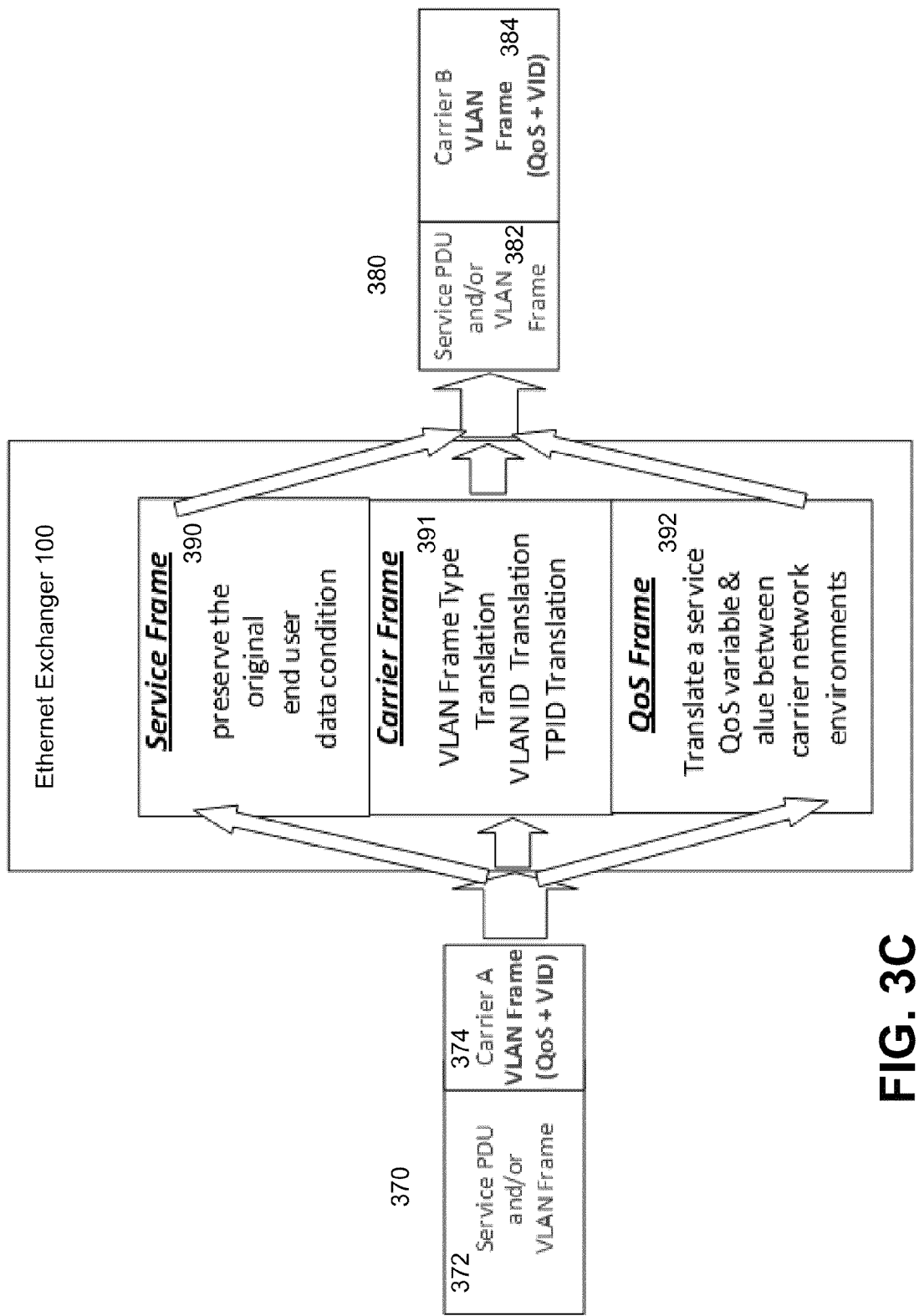
FIG. 3C is a block diagram that illustrates translation of quality of service variable, in accordance with some embodiments.

FIG. 3C is a block diagram that illustrates translation of quality of service variable, in accordance with some embodiments. In order to provide consistent quality of service (QoS) across multiple networks by different carriers, the Ethernet exchanger 100 needs to be able to translate a QoS variable from one carrier to a QoS variable from another carrier. For some embodiments, a frame from a carrier may be viewed as having three frame components: a service frame, a carrier frame, and a QoS frame. The Ethernet exchanger 100 may translate the information from the frame 370 into a service frame 390, a carrier frame 391 and a QoS frame 392. The service frame 390 may include the end user data. The carrier frame 391 may include information about the frame type, VLAN ID and TPID as translated by the Ethernet exchanger 100. The QoS frame 392 may include service variable as translated by the Ethernet exchanger 100 from a QoS used in the first network to a QoS used in the second network.

It may be noted that the frame portion 372 of the frame 370 is similar to the frame portion 382 of the frame 380. However, the frame portion 374 of the frame 370 is translated into the frame portion 384 of the frame 380. This reflects the translation of the QoS between the two networks. For some example embodiments, each carrier is required to enter QoS information about their networks using the web portal. When two carriers enter into an agreement, each of the carriers may need to use the web portal to indicate to the Ethernet exchanger 100 which of the QoS to use.

Figure 4:
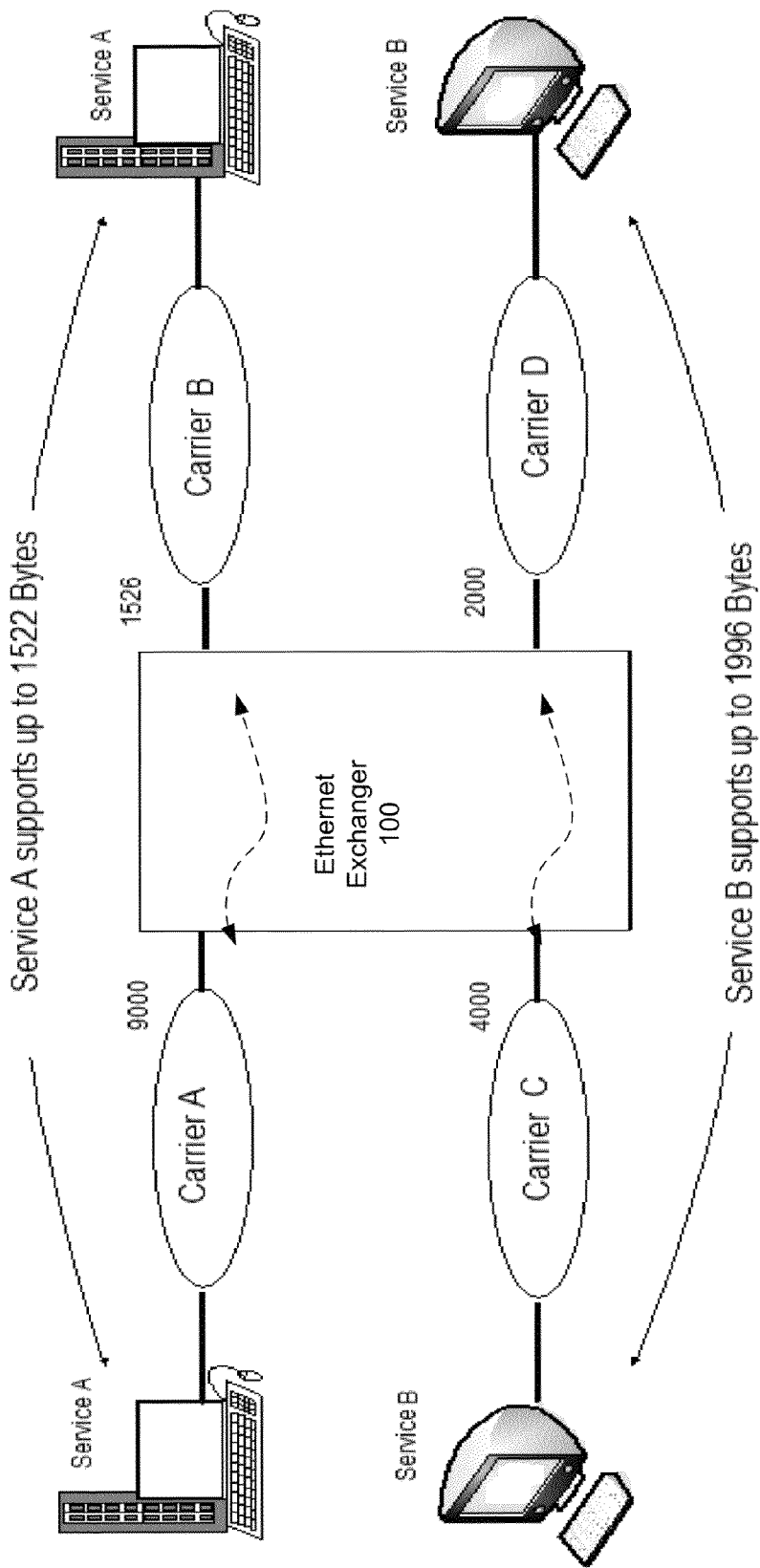
FIG. 4 illustrates an example of frame size adaptation as configured in an Ethernet exchanger, in accordance with some embodiments.

FIG. 4 illustrates an example of frame size adaptation as configured in an Ethernet exchanger, in accordance with some embodiments. Each carrier's network may have a different MTU. The MTU may be set by the carrier's network administrator, and it represents a largest frame (or packet) size in bytes that a carrier's network can transmit. For some embodiments, when the Ethernet exchanger 100 transmit a frame originating from one carrier network to another carrier network, the frame size may need to be adjusted. A frame from one carrier network that is larger than the MTU of another carrier may be divided into smaller frames. As illustrated in FIG. 4A, since the MTU of the carrier A is 9000 bytes, and the MTU of the carrier B is 1526 bytes, the service A can only be able to support up to 1522 bytes (4 bytes from the 1526 bytes is used for overhead). Similarly, since the MTU of the carrier C is 4000 bytes, and the MTU of the carrier D is 2000 bytes, the service B can only be able to support up to 1996 bytes (4 bytes from the 2000 bytes is used for overhead).

Monitoring and Trouble Shooting

Figure 5:
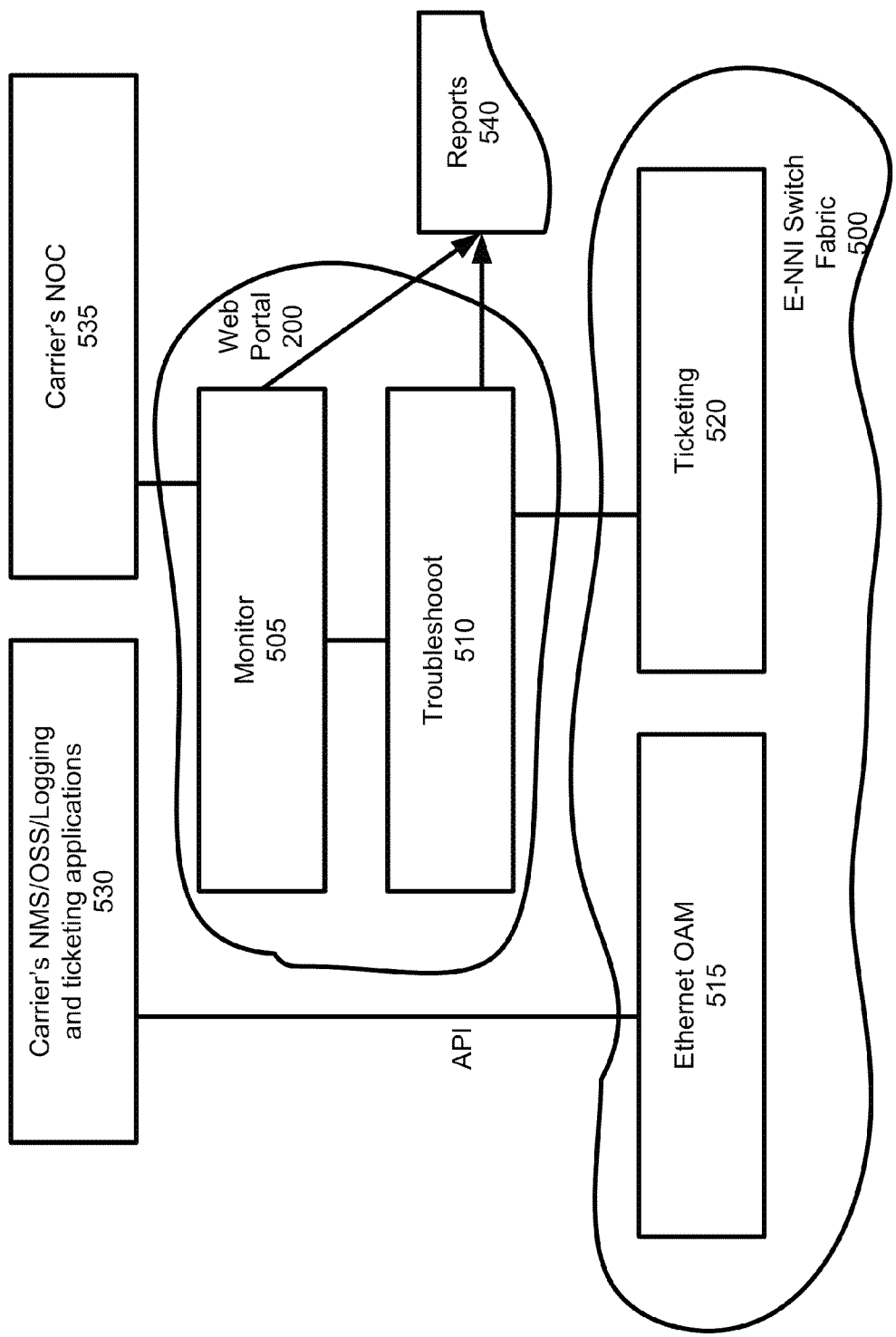
FIG. 5 is a block diagram that illustrates an example of monitoring and troubling shooting tools that may be available to the carriers, in accordance with some embodiments.

FIG. 5 is a block diagram that illustrates an example of monitoring and troubling shooting tools that may be available to the carriers, in accordance with some embodiments. The E-NNI switch fabric 500 and its Ethernet exchangers including, for example, Ethernet exchanger 100, may include scripted codes and/or hardware logic to monitor and report any potential issues that may affect the transmission of frames across the virtual circuits. For example, this may include Ethernet Operation and Maintenance (OAM) module 515 and ticketing module 520.

At the web portal level, the carriers may be able to access the monitor option 505 and the trouble shooting option 510 to interact with the Ethernet OAM module 515 and the ticketing module 520. The carriers may also be able to receive monitoring and troubleshooting reports 540. The monitor option may be used by members of the carrier's network operation center (NOC) 535 to submit tickets, test status, view link statistics, etc. For some embodiments, APIs may be available to allow the carriers' applications 530 to view monitoring and troubleshooting information and to perform other related network management operations. It may be noted that the APIs described herein may enable a standard method of communicating and exchanging information of the carriers and information stored in the database associated with the web portal and the switch fabric.

For some embodiments, a carrier may be able to perform network testing that encompass its network as well as the virtual circuits that the carrier is associated with. For some embodiments, the Ethernet exchanger 100 may prevent a carrier's test from reaching beyond the virtual circuit and into another carrier's network. However, when an authorization is provided, the Ethernet exchanger is configured to provide monitoring, troubleshooting and ticketing information as related to both the virtual circuit provisioned between the first Ethernet network and the second Ethernet network as well as the first Ethernet network and the second Ethernet network themselves.

For some embodiments, the Ethernet exchanger 100 is configured to allow testing to identify issues are relating to loss of connectivity, performance, etc. The loss of connectivity issues may be identified when there is no communication from one end of a virtual circuit to another end of the virtual circuit. The issue may be caused by configuration errors, or it may be caused by physical failures. Ping test of the virtual circuit end points or intermediate points may be performed isolate the cause of the issue. The performance issues may be related to loss of frames, slow or delay delivery of frames, delay variance (or jitter), or service throughput. Other issues may be related to queuing, drops of frames, etc.

Marketplace for Potential Partners

FIG. 6 is a block diagram that illustrates an example of a marketplace, in accordance with some embodiments. In addition to the switch fabric platform, the combination of the services offered by the web portal 200 and the Ethernet exchanger 100 offers access to a unique and rich ecosystem of potential content and technical partners in a secure collocation facility. The Ethernet exchanger 100 is integrated with the web portal 200 to form a marketplace where the carriers can learn services offered by other carriers, qualify them and set up connections with the other carriers, the web portal 200 including a configuration module 650 to allow the carriers to publish information, find information published by other carriers, and fill out templates based on information provided by the carriers. The web portal 200 is configured to cause the Ethernet exchanger 100 to provision the virtual circuits based on the filled out templates.

Figure 9:
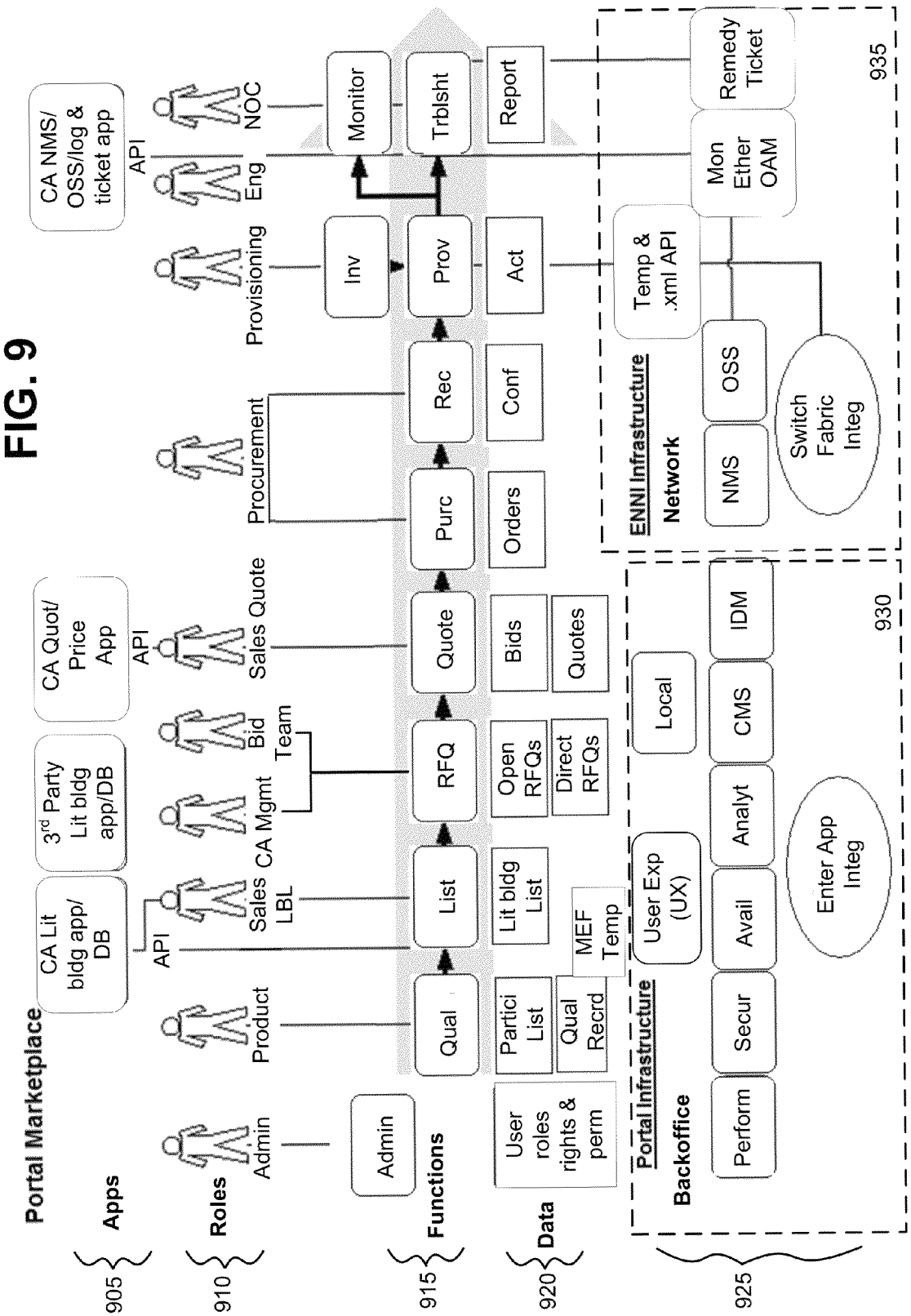
FIG. 9 illustrates an overall example diagram of a representation of a marketplace that includes a web portal and an External Network-to-Network Interface (E-NNI), in accordance with some example embodiments.

The marketplace 600 allows the discovery and sale of network services among the carriers within the secure collocation facility. This enables the carriers 1 to "n" to seamlessly extend their global reach and depth. The market for the many-to-many E-NNIs is driven by the needs of carriers to extend their Ethernet services beyond the physical footprint or capabilities of their asset or infrastructure. The marketplace 600 is designed to bring carriers together and interconnect their networks regardless of the platforms (e.g., Ethernet, MPLS, SASS, etc). Using the marketplace 600, the carriers can search and review services offered by other carriers, selectively identify services that meet their requirements and negotiate purchases with the desired carriers. FIG. 9 illustrates an overall example diagram of a representation of a marketplace that includes a web portal and an External Network-to-Network Interface (E-NNI), in accordance with some example embodiments. The example illustrates the integration of the web portal and its functionalities, the ENNI infrastructure and its functionalities, the roles of the representatives of the carriers, and type of data generated based on the interactions between the representatives of the carriers and the portal infrastructure as well as the ENNI infrastructure, along with other relevant information.

Flow Diagrams

Figure 7A:
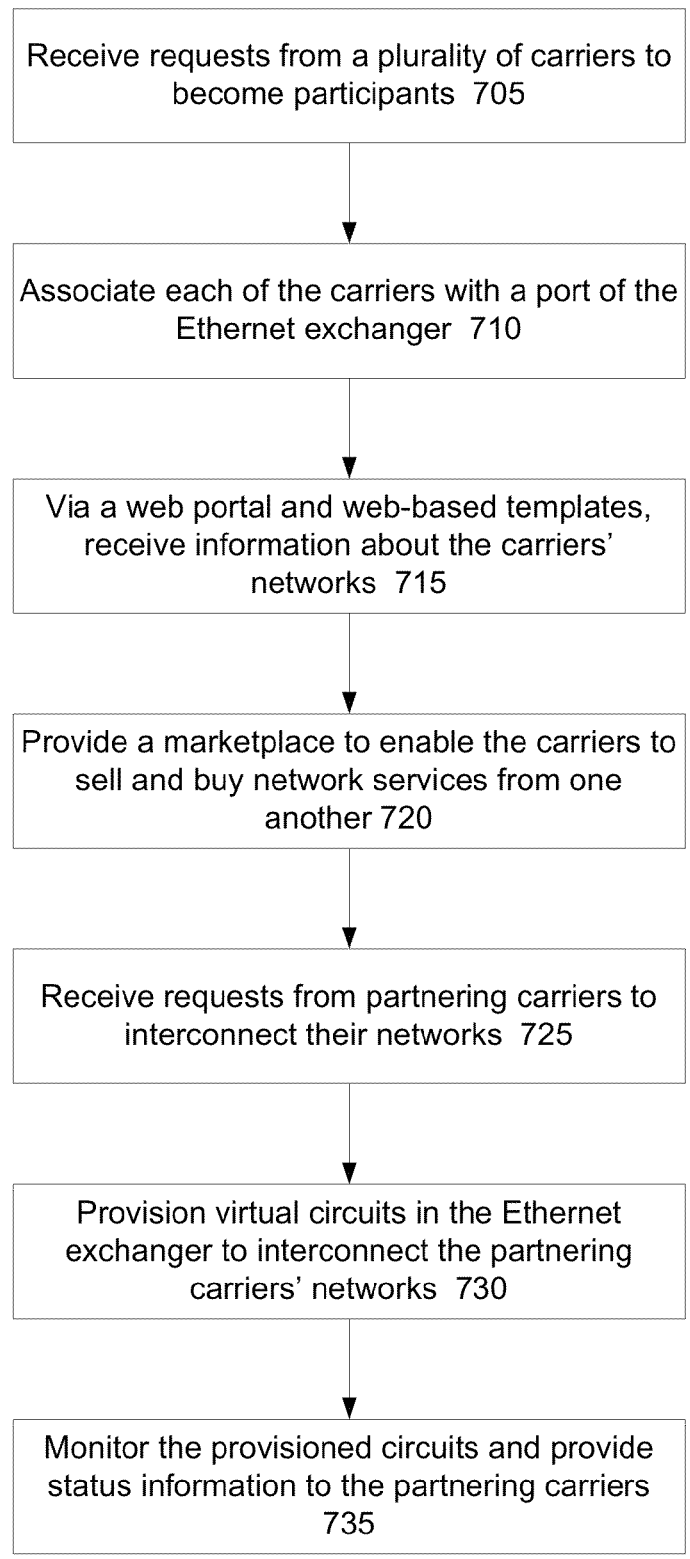
FIG. 7A is an example flow diagram that illustrates a process of providing interconnectivity services to the carriers, in accordance with some embodiments.

FIG. 7A is an example flow diagram that illustrates a process of providing interconnectivity services to the carriers, in accordance with some embodiments. At block 705, requests to become participants may be received from a plurality of carriers. The requests may be received via the web portal 200. At block 710, each carrier is qualified and associated with a port of the Ethernet exchanger 100. At block 715, information about the networks of the carriers is received. The information may be received via the web portal 200 and its web templates. It may be noted that the operations described in blocks 710 and 715 may be interchanged depending on the implementation.

At block 720, the services that the carriers want to showcase to other carriers may become accessible in a marketplace. The marketplace may also provide mechanism to enable the carriers who have network requirements to post them. As mentioned above, for some embodiments, this posting of the requirements may be in the form of an RFQ, and the RFQ may be sent to the appropriate carriers who offer network services that match with the requirements. The marketplace also provides each carrier to have a storefront so that their network services can be displayed, searched, viewed and ordered by other carriers.

Based on the carriers becoming partners, they may generate requests to have the connections established, as shown in block 725. At block 730, the Ethernet exchanger 100 provisions the virtual circuits to connect the networks of the requesting carriers. At block 735, the virtual circuits are monitored for potential issues and appropriate status information is provided to the carriers.

Figure 7B:
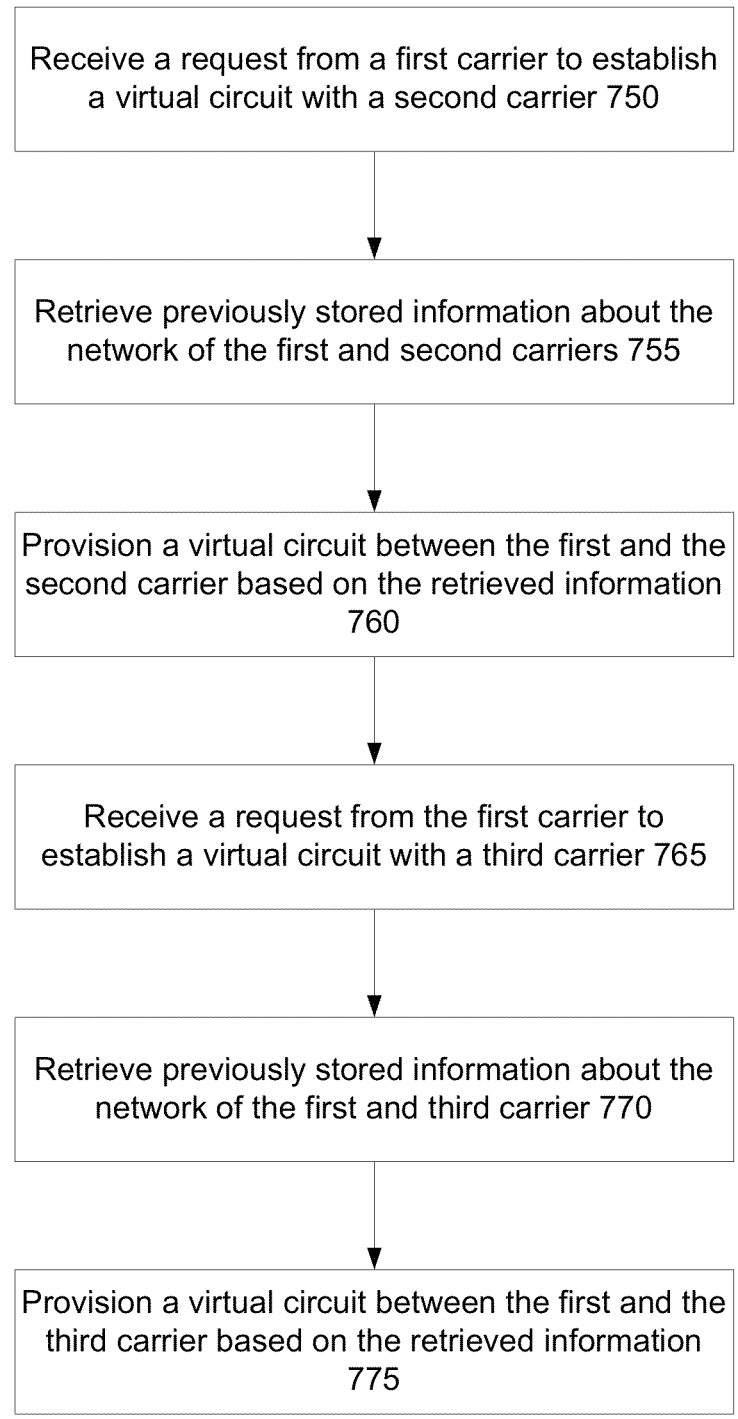
FIG. 7B is an example flow diagram that illustrates a process of reusing existing carrier's information to establish multiple virtual circuits, in accordance with some embodiments.

FIG. 7B is an example flow diagram that illustrates a process of reusing existing carrier's information to establish multiple virtual circuits, in accordance with some embodiments. At block 750, a request is received to establish a virtual circuit between a first carrier and a second carrier. At block 755, information about the first carrier and the second carrier is retrieved from a database. The information was provided by the first and second carriers as part of them becoming a participant. At block 760, a first virtual circuit is provisioned.

At block 765, another request is received to establish a virtual circuit between the first carrier and a third carrier. At block 770, information about the first carrier and the third carrier is retrieved from the database. It is noted that there is no need for the first carrier to provide the same information again for this request. The same information stored in the database for the first carrier is reused. The information about the third carrier was also provided when it became a participant. At block 775, a second virtual circuit is provisioned.

Figure 7C:
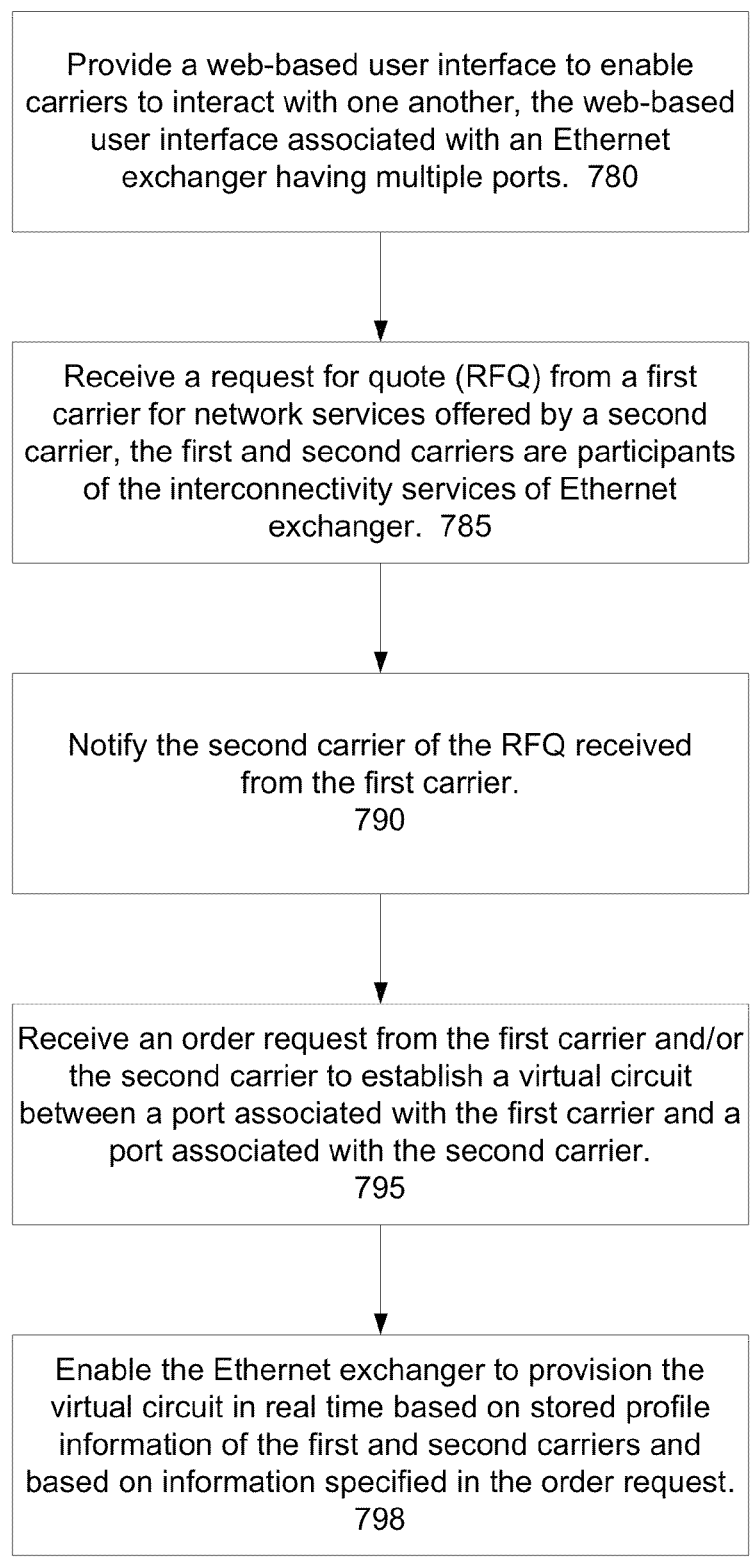
FIG. 7C is an example flow diagram that illustrates a process of facilitating partnership among the carriers, in accordance with some embodiments.

FIG. 7C is an example flow diagram that illustrates a process of facilitating partnership among the carriers, in accordance with some embodiments. At block 780, a web portal is provided to enable the carriers to interact with one another. The web portal is associated with an E-NNI infrastructure that includes a switch fabric and one or more Ethernet exchangers. The web portal includes options to enable a first carrier to submit a quote request (or RFQ) for network services to a second carrier. Both the first and the second carrier have already registered and become participants of the services offered by the web portal and the underlying E-NNI infrastructure. At block 785, the quote request is received from the first carrier. At block 790, the quote request is sent to the second carrier. The second carrier may review the quote request, provide a solution, and come to terms with the first carrier independent of the web portal.

At block 795, a request to establish a virtual circuit between the first and the second carriers is received. At block

798, the provisioning and configuration of the virtual circuit is performed based on the information stored for the first and the second carriers and based on any additional information provided with the request.

System Diagram

Figure 8:
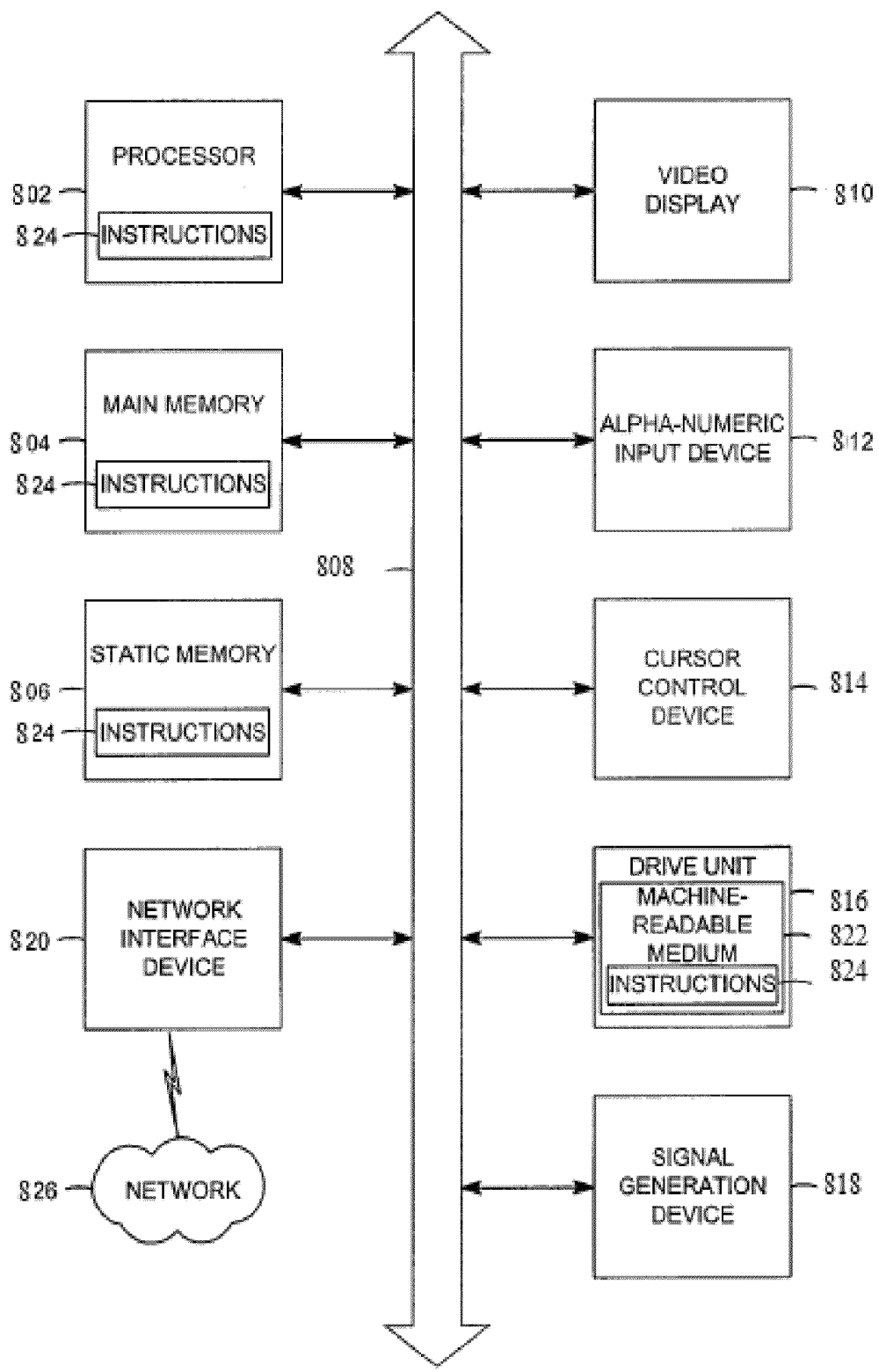
FIG. 8 illustrates an example diagram of a representation of a machine in the example form of a computer system that may be used, in accordance with some example embodiments.

FIG. 8 illustrates an example diagram of a representation of a machine in the example form of a computer system that may be used, in accordance with some example embodiments. As an example, computer system 800 may be a client computer system or machine used by a carrier to access the web portal 200. As another example, the computer system 800 may be a computer system where programs associated with the web portal 200 may be stored and executed.

A set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the current example, computer system 800 may include a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., liquid crystals display (LCD) or a cathode ray tube (CRT)). The computer system 800 also includes an input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 624) embodying any one or more of the methodologies or functions described herein. The instructions 824 may also reside, completely or at least partially, within the main memory 804, the static memory 806, and/or within the processor 802 during execution thereof by the computer system 800. The main memory 804 and the processor 802 also may constitute machine-readable media.

The instructions 824 may further be transmitted or received over a network 826 via the network interface device 820. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

Integration of Web Portal and Switch Fabric

FIG. 9 is a block diagram that illustrates an overall example representation of a marketplace that includes a web portal, in accordance with some example embodiments. The example illustrates portal experience by showing interactions between the carriers and the web portal 200, the functions performed by the web portal 200, and representative roles, rights and permissions. The example also illustrates how the carriers' information is collected and used, and the integration of the web portal with the portal infrastructure and the E-NNI or network infrastructure as related to auto provisioning of the virtual circuits.

The diagram in FIG. 9 includes application layer 905, roles layer 910, functions layer 915, data layer 920 and back office and network layer 925. The back office and network layer 925 includes portal infrastructure 930 and logic that performs operations relating to the web portal. These operations may include presenting the templates and soliciting information from the carriers, extracting the information from the templates, storing the extracted information into the database, etc. It may be noted that the templates may solicit information from the participating carriers by different mechanisms including, for example, manual entry, selection of possible entries presented in a pull down type menu, selection of existing information, and auto-populating fields of the templates. Other operations may be related to performance, security, availability, analytics, CMS, IDM, user experience, and localization. The portal infrastructure 930 may include logic for enterprise application integration.

The back office and network layer 925 also includes E-NNI infrastructure 935 and logic that performs operations relating to the switch fabric and the Ethernet exchanger. These operations may include provisioning virtual circuits to interconnect private Ethernet networks of the carriers, translating the Ethernet frames, mapping QoS, monitoring and troubleshooting network issues using NMS and OSS, generating support tickets, servicing APIs, etc. The E-NNI infrastructure 935 may include logic for switch fabric integration. The operations associated with the portal infrastructure 930 and the E-NNI infrastructure 935 may be implemented in software, hardware, or a combination of both.

The roles layer 910 illustrates different representative's roles that may interact with the web portal. For some embodiments, each carrier may assign a representative to serve as an administrator. The administrator will need to be registered with the web portal. The administrator may have all the necessary rights and permissions to perform operations in the web portal on behalf of the carrier. The administrator may invite other members of the carrier to join as the carrier's representatives. This feature provides the carrier complete control over roles that each carrier's representatives may be assigned. This may be referred to as self-service administration. Using this approach, the administrator only need to send out the invitation to the prospective representatives. The administrator does not have to deal with their credentials like setting up user ID and passwords, etc. It is up to the new representatives to create their own profiles, credentials, passwords, security questions, and so on. None of that information is ever passed to the administrator, which is a huge convenience for setting up new representatives. The risk of passwords and credentials being exposed to others is minimized. It may be noted that the invitation of the prospective representatives and the setting up of their profiles and credential information do not rely on any interaction with the service provider of the web portal. For some embodiments, functions of the administrator may optionally be performed by the service provider of the web portal. One example of a service provider of the web portal is Equinix, Inc. headquartered in Foster City, Calif.

The administrator feature is very convenient because the carriers can decide which roles and responsibilities they want to give to their group of representatives. The carriers can restrict representatives based on their roles and limit them to only duties that the carriers want them to perform. For example, only an administrator can submit a service request for a virtual circuit or a change request for virtual circuit. As another example, a representative in the sales role cannot have access to the monitoring and troubleshooting information. For some embodiments, the administrator can invite employees of the same carrier as well as non-employees to become representatives of the carrier. For example, the non-employees may be third party contractors who act on the carrier's behalf and under some type of agreement with the carrier. In addition to inviting new representatives, the administrator may also perform other administrative operations including, for example, create/terminate users, modify users, assign roles, rights and permissions, reset password, etc.

For some embodiments, when a new representative registers with the web portal and create necessary credentials, that new representative may initially have no permission rights to perform any operations, until authorization is given by the administrator. For example, the administrator may review the profile of the new representative and grant the new representative certain access rights. This may be in the form of check boxes. The access rights are then appended to the profile of the new representative and that becomes the new representative personalized experience on the web portal. For some embodiments, the web pages that are presented to a representative are personalized for that representative based on the granted access rights. This allows each representative to have a unique and personalized experience when interacting with the web portal. The representatives in the different roles may still enjoy personalized experience with the web portal even though they may not be performing the same operations.

In the diagram of FIG. 9, the roles layer 910 illustrates the following roles: administrator, product manager, sales (as related to lit buildings), carrier management, bid team, sales (as related to quotes), procurement, provisioning, engineering, and NOC. A representative in the product manager role is allowed to complete qualification form, view information of other participants, view other participants' qualification, restrict qualification view, etc. For example, a product manager for a carrier may not want representatives of a competing carrier to view the qualification information of the carrier that the product manager works for. A representative in the sales lit building role is allowed to update the lit building list (LBL), update the LBL, view the LBL online, export the LBL, restrict access to the LBL, etc. A representative in the carrier management role and/or in the bid team role is allowed to submit RFQ, view open RFQ, notify open RFQ, export RFQ, etc. A representative in the sales quote role is allowed to submit quote, save in-process quote, queue quote, export quote, notify quote, etc. A representative in the procurement role is allowed to order cross connect, order virtual cross connect, view open orders, notify order confirmation, view order history, etc. A representative in the provisioning role is allowed to notify, view, queue and approve pending order, auto provision approved orders, notify activation/verification, etc. A representative in the engineering role and/or NOC role is allowed to view NOC contacts, view escalation process, remedy integration, view service link stats, view monitoring history, etc.

The application layer 905 includes web services that are extended to the carriers via APIs to enable the carriers' applications to communicate directly with the web portal. The APIs may tell the carriers how to send the information and how the information is received by the web portal. The API may include information that enables the carriers' application to do the handshaking, mapping, and conversion between the different protocols and applications over to the standard used by the switch fabric. This may be convenient for the carriers that want to transmit a lot of information and would prefer, for example, batch processing over bulk processing. One example is an API that allows the carriers to push the lit building list (LBL). An LBL contains the buildings that are wired for Ethernet services and the characteristics of those Ethernet services. The carriers may use tools and various applications to maintain an LBL. The carrier may work with and maintain this list on their systems. However, the LBL API allows the lit building list information in the carriers' database to be pushed across the API and replicated onto the switch fabric's database without any manual data entry. The API is coded to receive the data in the proprietary format and convert the information into the standard format used in the switch fabric's database, and is also coded to automatically facilitate pushing of data from the carriers' database onto the switch fabric's database without any manual data entry.

Another example is an API that allows the carriers to push the carriers' pricing information. The quoting and pricing API enables the carriers to use their proprietary tools and various applications to generate, maintain, and track quoting and pricing information while that same data is replicated over the API into the ENNI's database. Yet another example is an API that allows pulling/pushing troubleshooting and ticketing information from the web portal and the switch fabric. One example of a ticketing system used by the switch fabric is the Remedy system by BMC Software, Inc of Houston, Tex. Remedy is a customer relationship tool which can be used to log/monitor the issues or problems faced by the carriers by the means of incident management tickets. Each ticket represents an issue assigned to a support team to resolve.

The function layers 915 include functions that correspond to the operations performed by each of the roles in the roles layer 910. These functions include administration, qualification, list, RFQ, quote, purchase, receive, inventory and provision, and monitor and troubleshoot. The data layer 920 includes data that may be generated by the functions of the functions layer 915. The data may include user roles, rights and permission, participant listings and qualification records, LBL, open RFQs and directed RFQs, bids and quotes, orders, confirmation, activations and reports. It may be noted that by allowing the carriers to provide their LBL, the process of identifying a lit building becomes much faster and easier. The LBL of all the participating carriers can be stored in a searchable and relational database so that they can be discovered by, for example, street address, metropolitan areas, cities, zip codes or other similar general geographical identifying conveyed information. Being able to discover the LBL and being to place an order via a web portal that is integrated with a switch fabric enable the carriers to be able to connect and take advantage of the services of other carriers almost immediately.

For some embodiments, a the Ethernet switch platform may include a billing support system (BSS) to enable ordering, billing, keeping track of carriers, and managing carrier relationship. For some other embodiments, the Ethernet switch platform may include a service bureau system to enable the carriers to use the web portal to negotiate and enter into agreements for network services. For example, the carriers can use the web portal to publish and search for network services, to negotiate and become partners, to place provisioning orders, and to monitor and diagnose network issues, and to pay for services received.

Figure 10:
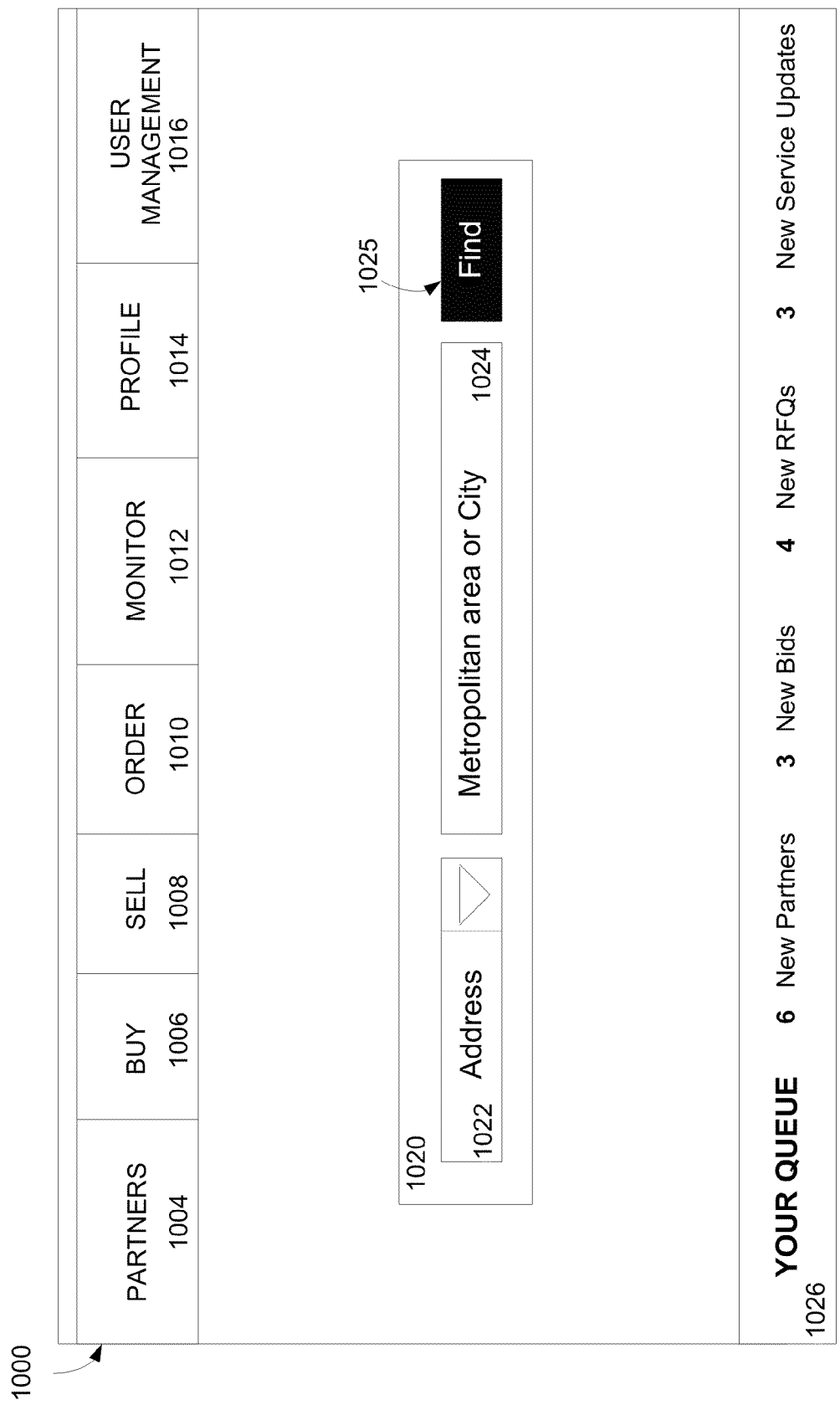
FIG. 10 illustrates an example screen of a web portal, in accordance with some example embodiments.

FIG. 10 illustrates an example screen of a web portal, in accordance with some example embodiments. Screen 1000 may be associated with a home page of the web portal. It may include options to enable the carriers and their representatives to perform operations as described in FIG. 9. The web portal (or web-enabled user interface) may be resident on a server and is configured to present web pages including the home page and templates to a browser application on a client machine to solicit information from the participating carriers. The information is then extracted from the web pages and the templates and stored in an associated database. This enable the participating carriers to publish network services and capabilities offered, search for network services and capabilities offered by each carrier, submit requests for quotes (RFQs) and responses to the RFQs, initiate a provisioning of the virtual circuits between their private Ethernet networks, and monitor and troubleshoot the virtual circuits as well as their own private Ethernet networks from the web portal.

Referring to the screen 1000, Partners option 1004 may allow viewing of participating carriers' information. This may include a company profile, qualification information, LBL information, etc. Buy option 1006 may allow the representatives to submit RFQs, view open RFQs, export RFQs, etc. Sell option 1008 may allow the representatives to update LBL, submit quotes, etc. Order option 1010 may allow the representatives to request for provisioning of virtual circuits. Monitor option 1012 may allow the representatives to receive status and diagnostic information from the integrated switch fabric. Profile option 1014 may allow the representatives to review and update their profiles. User management option 1016 may allow the administrator representatives to perform operations as described above with FIG. 9. It may be noted that, depending on the role of a representative from a carrier, some of the options described may not be visible. For example, when a representative assigned with the NOC role signing on to the web portal, that representative may not see the order option 1010. Being able to view the order option 1010 is the experience that may be reserved for the representatives who are assigned the procurement or provisioning roles.

For some embodiments, the web portal may include a screen that provides a search option to allow the representatives to search for information related to the lit buildings. For example, the screen 1000 includes a search box 1020 that includes an input area 1022 to specify an address and an input area 1024 to specify a name of a metropolitan area or a city. Optionally, the search box 1020 may include input areas to allow entry of a zip code or other similar general geographical identifying conveyed information to enable searching for the list buildings based on these search parameters. For example, instead of using a street address, the input area 1022 may be used for a zip code. After an address and/or a name of a metropolitan area or city are specified, button 1025 may be used to initiate the search of the database. The screen 1000 may also include a side bar or queue area 1026 to display other related information such as, for example, the number of new partners, the number of new bids, the number of new RFQs, and the number of new service updates. The position of the side bar area 1026 and the type of information displayed in the side bar 1026 are illustrated as an example and may vary depending on the implementation of the screen 1000.

Figure 11:
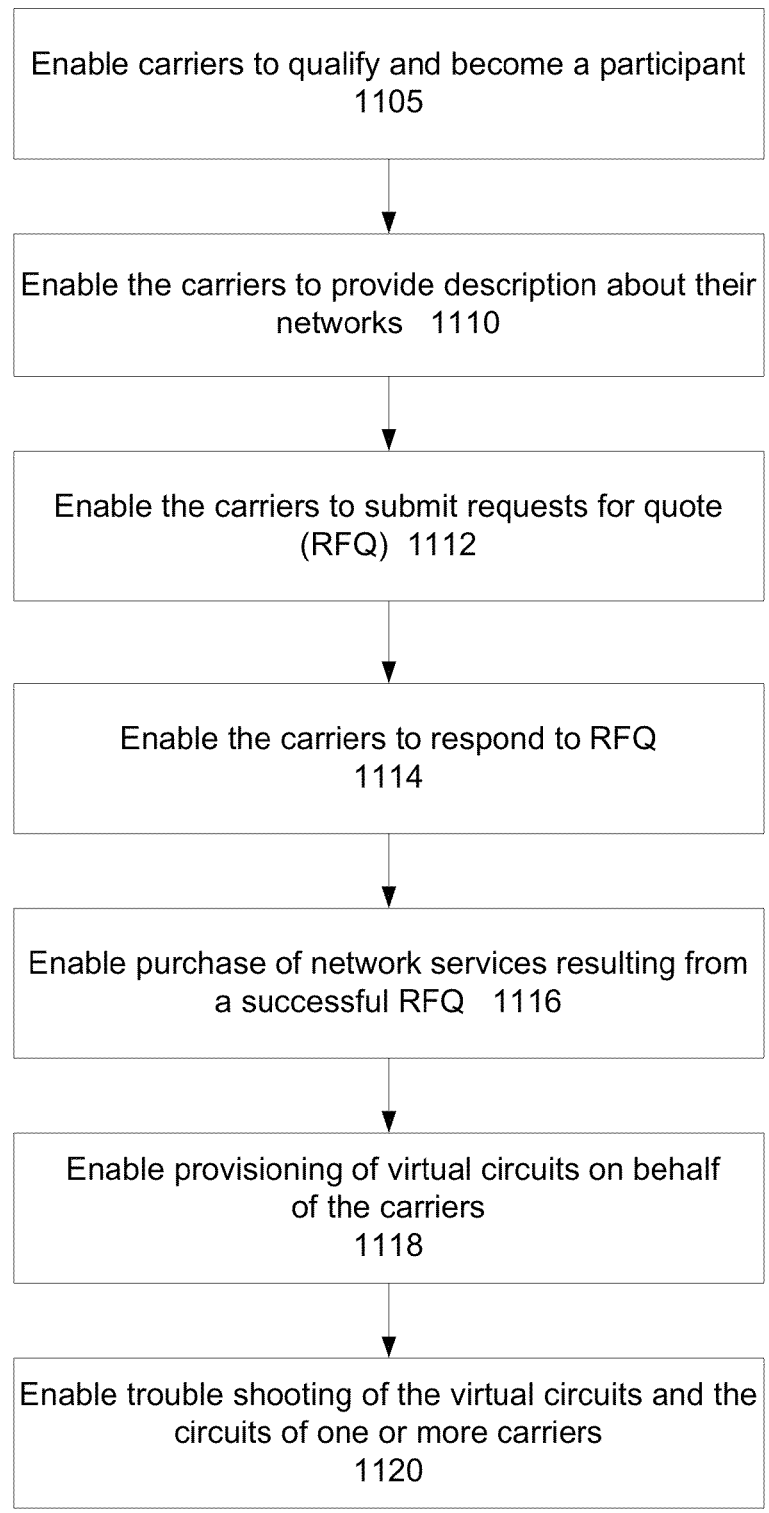
FIG. 11 is an example flow diagram that illustrates a process of enabling a carrier to utilize services offered by the marketplace, in accordance with some embodiments.

FIG. 11 is an example flow diagram that illustrates a process of enabling a carrier to utilize services offered by a web portal, in accordance with some embodiments. At block 1105, the carriers go through the qualification process and become partners. The qualification process may require the carriers to fill out a qualification template. At block 1110, the carriers may need to provide information about their networks and services. After the carriers become participants, they may view other carriers' services to search for services that they may need. Once a service is identified, a carrier may submit an RFQ, as shown in block 1112. At block 1114, a carrier that is offering services may receive an RFQ from another carrier. In that case, the carrier may respond to the RFQ. Based on an agreement being established between a carrier that submits an RFQ and a carrier that responds to the RFQ, a purchase of the service may occur, as shown in block 1116. At block 1118, an order may be generated to provision a virtual circuit. At block 1120, options may be made available to enable monitoring and troubleshooting the virtual circuits.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C+, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure.

Thus, what has been described is a web-enabled user experience for commerce and collaboration in private network exchanges. A web-enabled user interface is integrated with a switch fabric and configured to automate an end-to-end process of interconnecting private Ethernet networks of carriers via one or more virtual circuits established by one or more Ethernet exchangers of the switch fabric. The Ethernet exchanger has a plurality of ports to enable connecting the private Ethernet networks of the carriers. The web-enabled user interface is configured to present web pages and templates to solicit information from the carriers, to enable the carriers to submit requests for quotes (RFQs) and responses to the RFQs, to provision the virtual circuits between the private Ethernet networks, and to monitor and troubleshoot the virtual circuits. Each of the carriers is to assign a representative as an administrator having administrator role. The administrator is authorized to assign other roles to a group of representatives and to grant rights and permissions to these representatives. Navigation of the web-enabled user interface by a representative in the group is personalized to one or more of the assigned role and the access privileges granted to that representative.

It may be appreciated that FIGS. 1-11 are merely representational and may not be drawn to scale. Certain proportions thereof may be exaggerated, while others may be minimized. Accordingly, the specification and drawings are to be regarded in an illustrative rather than a restrictive sense.

What is claimed is:

1. A method for an Ethernet exchange service implementing a physical integrated switch fabric, comprising:
enabling a plurality of carriers to participate in the Ethernet exchange service that comprises a web-enabled user interface and the physical integrated switch fabric having one or more Ethernet exchangers, the plurality of carriers having their private Ethernet networks connected to ports of the one or more Ethernet exchangers, the one or more Ethernet exchangers are configured to provision virtual circuits interconnecting the private Ethernet networks;
enabling each of the plurality of carriers to assign roles and rights and permissions to an administrator and to a group of representatives to act on behalf of each of the carriers;
enabling the administrator and each of the representatives in the group to have a different experience using the web-enabled user interface based on one or more of their assigned roles, rights, and permissions; and
enabling the administrator and one or more of the representatives in the group to enter lit building information on behalf of their carrier using one or more templates, wherein the lit building information is to be stored in a searchable database for discovery by other carriers, where portions of the Ethernet exchange service including the steps of the method are implemented by software scripted routines, hardware logic, and any combination of both, and any software is tangibly stored on a non-transitory machine-readable medium.

2. The method of claim 1, further comprising:
enabling the administrator and the one or more representatives in the group of representatives to submit request for quotes, respond to the request for quotes, placing orders for the virtual circuits, and monitor and troubleshoot issues related to the virtual circuits.

3. The method of claim 2, wherein the administrator and the representatives in the group performs tasks on behalf of their carriers using web pages associated with the web-enabled user interface, wherein the web pages include a home page having options to enable searching for lit buildings based on street addresses and metropolitan areas or cities, and wherein the homepage includes options to submit the request for quotes and respond to the request for quotes.

4. The method of claim 3, wherein the templates include a carrier qualification template to allow that carrier to qualify and a carrier profile template to list their information, services offered as well as network capabilities.

5. The method of claim 1, wherein the roles assigned to the one or more representatives in the group include roles that are authorized to search for services, submit a request for quote and responses to the request for quotes, provision the virtual circuits between the private Ethernet networks, and monitor and troubleshoot the virtual circuits.

6. The method of claim 1, further comprising associating the web-enabled user interface with a website on the world wide web with a homepage having a plurality of options to enable the administrator and the group of representatives to perform actions on behalf of their participating carriers, and wherein the options and web pages associated with the homepage are selectively presented to each of the representatives in the group based on their one or more assigned roles and granted rights and permissions.

7. The method of claim 6, further comprising the assigned roles and the granted rights and permissions to the representatives in the group by inviting them to become a member of the web site, and requiring each of the representatives in the group to provide own credential information without involving the administrator, and wherein the rights and permissions are granted by the administrator subsequent to each of the representatives having established their own credential information with the web site.

8. The method of claim 1, further comprising performing translation services in between two private Ethernet networks independent of the proprietary protocol used in either private Ethernet network, wherein the switch fabric includes an application coded to act as an agent to convert back and forth between various protocols, bandwidth requirements among the private Ethernet networks of the participating carriers.

9. The method of claim 8, further comprising providing application programming interfaces (API's) 1) to enable the participating carriers to push information regarding their private Ethernet network from their searchable database across the API in a standard way to the web-enabled user interface or 2) to enable the web-enabled user interface to pull the information regarding a participating carrier's network from their searchable database across the API in a standard way, wherein the API's are configured to enable the participating carriers 1) to view the information the participating carriers' applications on the web-enabled user interface, and 2) to store the information in their own database, which is then replicated in the searchable database associated with the Ethernet exchange service, and eliminate a need to manually map out a migration of data in particular fields in a participating carriers' database to the particular fields in the searchable database associated with the Ethernet exchanger.

10. The method of claim 1, wherein the switch fabric and the web-enabled user interface are carrier-neutral, wherein the web-enabled user interface is configured to allow the discovery of lit buildings by capacity, price, service level, and buildings that have Ethernet services, wherein the discovery is enabled by the one or more templates, and wherein information provided by participating carriers via the one or more templates is stored and aggregated to be searchable and publishable.

11. A non-transitory machine-readable medium storing instructions, which when executed by a machine, are configured to cause the machine to perform the operations in claim 1.

12. A system for enabling a plurality of carriers to participate in an Ethernet exchange service, comprising:
a web-enabled user interface and a physical integrated switch fabric having one or more Ethernet exchangers, the plurality of carriers having their private Ethernet networks connected to ports of the one or more Ethernet exchangers, where they are configured to provision virtual circuits interconnecting the private Ethernet networks,
wherein the physical integrated switch fabric is configured to enable each of the plurality of carriers to assign roles and rights and permissions to an administrator and to a group of representatives to act on behalf of each of the plurality of carriers,
wherein the web-enabled user interface is configured to provide a different experience to the administrator and each of the representatives in the group based on one or more of their roles and rights and permissions, and
one or more templates from the web-enabled user interface configured to permit the administrator and one or more of the representatives in the group to enter lit building information on behalf of their carrier, wherein the lit building information is stored in a searchable database for discovery by other carriers, where portions of the system including the web-enabled user interface and the physical integrated switch fabric are implemented by software scripted routines, hardware logic, and any combination of both, and any software is tangibly stored on a non-transitory machine-readable medium.

13. The system of claim 12, wherein the web-enabled user interface is configured to enable the administrator and the one or more representatives in the group to submit request for quotes, respond to the request for quotes, place orders for the virtual circuits, and monitor and troubleshoot issues related to the virtual circuits.

14. The system of claim 13, wherein the administrator and the representatives in the group performs tasks on behalf of their carriers using web pages associated with the web-enabled user interface, wherein the web pages include a home page having options to enable searching for lit buildings based on street addresses and metropolitan areas or cities, and wherein the homepage includes options to submit the request for quotes and respond to the request for quotes.

15. The system of claim 14, wherein the templates include a carrier qualification template to allow that carrier to qualify and a carrier profile template to list their information, services offered as well as network capabilities.

16. The system of claim 12, wherein the roles assigned to the representatives in the group include roles that are authorized to search for services, submit a request for quote and responses to the request for quotes, provision the virtual circuits between the private Ethernet networks, and monitor and troubleshoot the virtual circuits.

17. The system of claim 12, wherein the web-enabled user interface is associated with a website on the world wide web and comprises a homepage having a plurality of options to enable the administrator and the group of representatives to perform actions on behalf of their participating carriers, and wherein options and web pages associated with the homepage are selectively presented to each of the one or more representatives in the group based on the one or more of their assigned roles and the granted rights and permissions.

18. The system of claim 12, wherein the switch fabric is configured to perform translation services in between two private Ethernet networks independent of the proprietary protocol used in either private Ethernet network, wherein the switch fabric includes an application coded to act as an agent to convert back and forth between various protocols, bandwidth requirements among the private Ethernet networks of the participating carriers.

19. The system of claim 18, wherein the web-enabled user interface is configured to provide application programming interfaces (API's) 1) to enable the participating carriers to push information regarding their network from their database across the API in a standard way to the web-enabled user interface or 2) to enable the web-enabled user interface to pull information regarding a participating carrier's network from their database across the API in a standard way, wherein the API's are configured to enable the participating carriers 1) to view the information from participating carriers' applications on the web-enabled user interface ,and 2) to store the information in their own said database, which is then replicated in the database associated with the Ethernet exchange service, and eliminate a need to manually map out a migration of data in particular fields in a participating carriers' database to the particular fields in the database associated with the Ethernet exchange service.

20. The system of claim 12, wherein the physical integrated switch fabric and the web-enabled user interface are carrier-neutral, wherein the web-enabled user interface is configured to allow discovery of lit buildings by capacity, price, service level, and buildings that have Ethernet services, wherein the discovery is enabled by the one or more templates, and wherein information provided by the participating carriers via the one or more templates is stored and aggregated to be searchable and publishable.

\* \* \* \* \*